United States Patent
Braedt et al.

(10) Patent No.: US 12,037,078 B2
(45) Date of Patent: Jul. 16, 2024

(54) MULTI-SPROCKET ARRANGEMENT FOR A REAR WHEEL ASSEMBLY FOR A BICYCLE, AND REAR WHEEL ASSEMBLY

(71) Applicant: SRAM DEUTSCHLAND GmbH, Schweinfurt (DE)

(72) Inventors: Henrik Braedt, Dittelbrunn-Ot Hambach (DE); Sebastian Heyna, Dittelbrunn-Ot Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 166 days.

(21) Appl. No.: 17/458,808

(22) Filed: Aug. 27, 2021

(65) Prior Publication Data

US 2022/0063762 A1 Mar. 3, 2022

(30) Foreign Application Priority Data

Sep. 1, 2020 (DE) .................... 10 2020 005 373.4

(51) Int. Cl.
*B62M 9/10* (2006.01)
*B62M 9/04* (2006.01)
*B62M 9/06* (2006.01)
*B62M 9/12* (2006.01)

(52) U.S. Cl.
CPC ............... *B62M 9/10* (2013.01); *B62M 9/04* (2013.01); *B62M 9/06* (2013.01); *B62M 9/12* (2013.01)

(58) Field of Classification Search
CPC .......... B62M 9/10; B62M 9/105; B62M 9/12; B62M 9/04; B62M 9/06; B62M 9/125; B62M 9/126; F16H 55/30
See application file for complete search history.

(56) References Cited

U.S. PATENT DOCUMENTS

| | | | | |
|---|---|---|---|---|
| 6,382,381 B1 * | 5/2002 | Okajima | ............... | B62M 9/10 |
| | | | | 192/64 |
| 7,189,172 B2 * | 3/2007 | Shahana | ............... | B62M 9/125 |
| | | | | 474/80 |
| 8,485,335 B2 * | 7/2013 | Schlanger | ............... | F16D 41/36 |
| | | | | 301/124.2 |
| 9,193,416 B2 * | 11/2015 | Tokuyama | ............... | B62M 9/10 |

(Continued)

FOREIGN PATENT DOCUMENTS

| | | |
|---|---|---|
| DE | 102011107162 A2 | 1/2013 |
| DE | 102017004853 A2 | 3/2018 |

(Continued)

*Primary Examiner* — Michael R Mansen
*Assistant Examiner* — Raveen J Dias

(57) ABSTRACT

A multi-sprocket arrangement for a bicycle rear wheel assembly is provided. The arrangement has an axis of rotation and is designed for coupling, for conjoint rotation, to a driver of the rear wheel assembly. The arrangement comprises at least eleven sprockets with differing numbers of teeth. At least two sprockets with the smallest numbers of teeth are formed in a radially self-supporting manner and are coupled to the driver via at least one further sprocket with a greater number of teeth. The three sprockets with the smallest numbers of teeth are arranged such that a sprocket center plane of the sprocket with the third smallest number of teeth of the multi-sprocket arrangement runs in the region of an axial end surface of the driver or axially outside the driver.

18 Claims, 14 Drawing Sheets

(56) References Cited

U.S. PATENT DOCUMENTS

| | | | |
|---|---|---|---|
| 9,227,465 B2* | 1/2016 | Nakajima | B60B 27/026 |
| 9,446,815 B2* | 9/2016 | Lin | B62M 9/10 |
| 9,533,735 B2* | 1/2017 | Braedt | F16H 9/24 |
| 9,771,127 B2* | 9/2017 | Braedt | F16D 1/108 |
| 9,822,865 B2* | 11/2017 | Chen | B60B 27/047 |
| 10,053,187 B2* | 8/2018 | Kamada | F16H 55/30 |
| 10,093,388 B2* | 10/2018 | Kamada | B62M 9/10 |
| 10,093,390 B2* | 10/2018 | Braedt | F16H 9/24 |
| 10,315,727 B2* | 6/2019 | Nishimoto | F16H 55/30 |
| 10,377,174 B2* | 8/2019 | Fujita | B60B 27/0021 |
| 10,472,019 B2* | 11/2019 | Pfeiffer | B62K 25/02 |
| 10,507,690 B2* | 12/2019 | Fujita | B60B 27/0021 |
| 10,752,320 B2* | 8/2020 | Oka | B60B 27/047 |
| 10,919,339 B2* | 2/2021 | Yuasa | F16H 57/0025 |
| 10,946,931 B2* | 3/2021 | Fujita | B62M 9/10 |
| 10,946,932 B2* | 3/2021 | Braedt | F16H 9/24 |
| 10,946,933 B2* | 3/2021 | Braedt | B62M 9/10 |
| 11,052,969 B2* | 7/2021 | Civiero | B62M 9/10 |
| 11,059,541 B2* | 7/2021 | Fujita | B60B 27/023 |
| 11,097,807 B2* | 8/2021 | Fujita | B62L 1/005 |
| 11,179,967 B2* | 11/2021 | Fujita | B60B 27/023 |
| 11,192,605 B2* | 12/2021 | Braedt | F16H 9/24 |
| 11,230,350 B2* | 1/2022 | Braedt | B62M 9/125 |
| 11,279,442 B2* | 3/2022 | Oka | B60B 27/047 |
| 11,305,837 B2* | 4/2022 | Komatsu | F16H 57/0025 |
| 11,364,971 B2* | 6/2022 | Kamada | F16H 55/30 |
| 11,529,827 B2* | 12/2022 | Lin | B62M 9/10 |
| 11,548,318 B2* | 1/2023 | Civiero | F16H 55/30 |
| 11,591,043 B2* | 2/2023 | Civiero | B62M 9/10 |
| 11,603,166 B2* | 3/2023 | Fujita | B62M 9/10 |
| 11,642,913 B2* | 5/2023 | Oka | F16D 3/06 301/6.9 |
| 2011/0130233 A1* | 6/2011 | Tokuyama | B62M 9/10 474/116 |
| 2012/0322598 A1* | 12/2012 | Lin | B62M 9/10 474/160 |
| 2013/0017914 A1* | 1/2013 | Braedt | B62M 9/10 403/299 |
| 2013/0241175 A1* | 9/2013 | Talavasek | B62M 6/60 280/288.4 |
| 2014/0265539 A1* | 9/2014 | Thompson | B60B 27/04 301/110.5 |
| 2014/0306512 A1* | 10/2014 | Nakajima | B60B 35/004 301/132 |
| 2015/0024884 A1* | 1/2015 | Braedt | F16H 9/24 474/78 |
| 2016/0083045 A1* | 3/2016 | Lin | F16H 55/30 474/160 |
| 2016/0167737 A1* | 6/2016 | Tokuyama | B62M 9/10 474/160 |
| 2016/0200395 A1* | 7/2016 | Braedt | B62M 9/10 403/299 |
| 2017/0021667 A1* | 1/2017 | Chen | F16H 55/12 |
| 2017/0043840 A1* | 2/2017 | Reinbold | F16H 55/30 |
| 2017/0057598 A1* | 3/2017 | Thrash | B62M 9/10 |
| 2017/0073043 A1* | 3/2017 | Braedt | B62M 9/10 |
| 2017/0217539 A1* | 8/2017 | Braedt | B62M 9/10 |
| 2017/0341707 A1* | 11/2017 | Braedt | F16D 1/108 |
| 2017/0369124 A1* | 12/2017 | Kamada | F16H 55/30 |
| 2018/0009505 A1* | 1/2018 | Kamada | F16H 55/30 |
| 2018/0105229 A1* | 4/2018 | Reinbold | B62M 9/10 |
| 2018/0215444 A1* | 8/2018 | Reinbold | B62M 9/10 |
| 2018/0229801 A1* | 8/2018 | Nishimoto | F16H 55/30 |
| 2018/0333986 A1* | 11/2018 | Yuasa | B60B 27/023 |
| 2018/0345723 A1* | 12/2018 | Fujita | B60B 27/023 |
| 2018/0346064 A1* | 12/2018 | Fujita | B62M 9/10 |
| 2018/0346065 A1* | 12/2018 | Fujita | B62M 9/10 |
| 2018/0346067 A1* | 12/2018 | Fujita | F16H 55/30 |
| 2018/0370596 A1* | 12/2018 | Braedt | F16H 55/30 |
| 2018/0370597 A1* | 12/2018 | Braedt | B62M 9/10 |
| 2019/0031286 A1* | 1/2019 | Fujita | F16D 41/30 |
| 2019/0031288 A1* | 1/2019 | Kamada | B62M 9/1242 |
| 2019/0047324 A1* | 2/2019 | Fujita | B62M 9/10 |
| 2019/0063585 A1* | 2/2019 | Fujita | B62M 9/12 |
| 2019/0092425 A1* | 3/2019 | Fujita | B60B 27/04 |
| 2019/0092426 A1* | 3/2019 | Oka | B60B 27/023 |
| 2019/0092427 A1* | 3/2019 | Oka | B62M 9/10 |
| 2019/0112004 A1* | 4/2019 | Civiero | B62M 9/04 |
| 2019/0126679 A1* | 5/2019 | Komatsu | B60B 27/04 |
| 2019/0127022 A1* | 5/2019 | Komatsu | F16D 1/10 |
| 2019/0232717 A1* | 8/2019 | Fujita | B62M 9/10 |
| 2020/0062033 A1* | 2/2020 | Bots | F16D 1/10 |
| 2020/0198728 A1* | 6/2020 | Braedt | B62M 9/125 |
| 2020/0298619 A1* | 9/2020 | Oka | B60B 27/023 |
| 2020/0300307 A1* | 9/2020 | Oka | F16D 3/06 |
| 2021/0031560 A1* | 2/2021 | Civiero | B60B 27/023 |
| 2021/0031875 A1* | 2/2021 | Civiero | B62M 9/10 |
| 2021/0031876 A1* | 2/2021 | Civiero | B62M 9/10 |
| 2021/0114688 A1* | 4/2021 | Li | F16H 55/30 |
| 2021/0131547 A1* | 5/2021 | Civiero | F16B 37/0892 |
| 2021/0171155 A1* | 6/2021 | Fukumori | B62M 9/10 |
| 2021/0339826 A1* | 11/2021 | Fujita | F16D 41/30 |
| 2022/0063761 A1* | 3/2022 | Heyna | B62M 9/04 |
| 2022/0144381 A1* | 5/2022 | Rodriguez | B62M 11/04 |
| 2022/0153388 A1* | 5/2022 | Oka | B62M 9/12 |
| 2022/0185013 A1* | 6/2022 | Lin | B60B 27/047 |
| 2022/0258833 A1* | 8/2022 | Li | B62M 9/10 |
| 2022/0348286 A1* | 11/2022 | Fujita | B62M 9/10 |
| 2022/0348287 A1* | 11/2022 | Fujita | B62M 9/10 |
| 2022/0363339 A1* | 11/2022 | Braedt | B62K 25/02 |

FOREIGN PATENT DOCUMENTS

| | | |
|---|---|---|
| DE | 102018126529 A1 | 5/2019 |
| EP | 1342657 B1 | 5/2008 |
| EP | 2826701 A1 | 1/2015 |
| EP | 3109062 A1 | 12/2016 |
| EP | 3470321 A1 | 4/2019 |
| EP | 3771629 A1 | 2/2021 |
| EP | 3771630 A1 | 2/2021 |
| EP | 3819201 A1 | 5/2021 |
| TW | 202026201 A | 7/2020 |

* cited by examiner

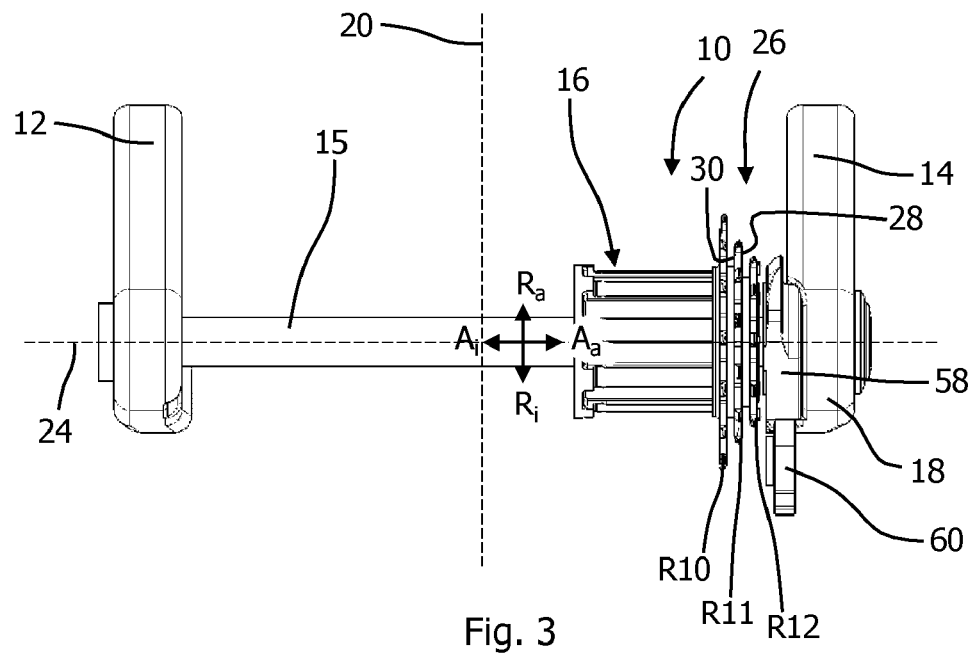
Fig. 3
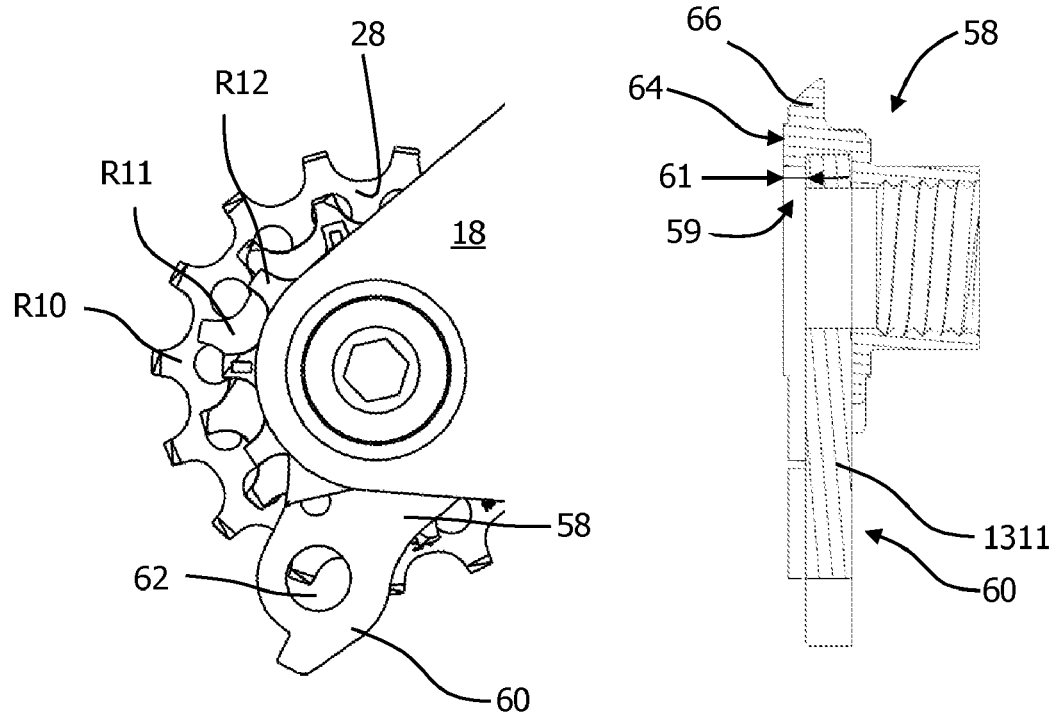
Fig. 4a
Fig. 4b

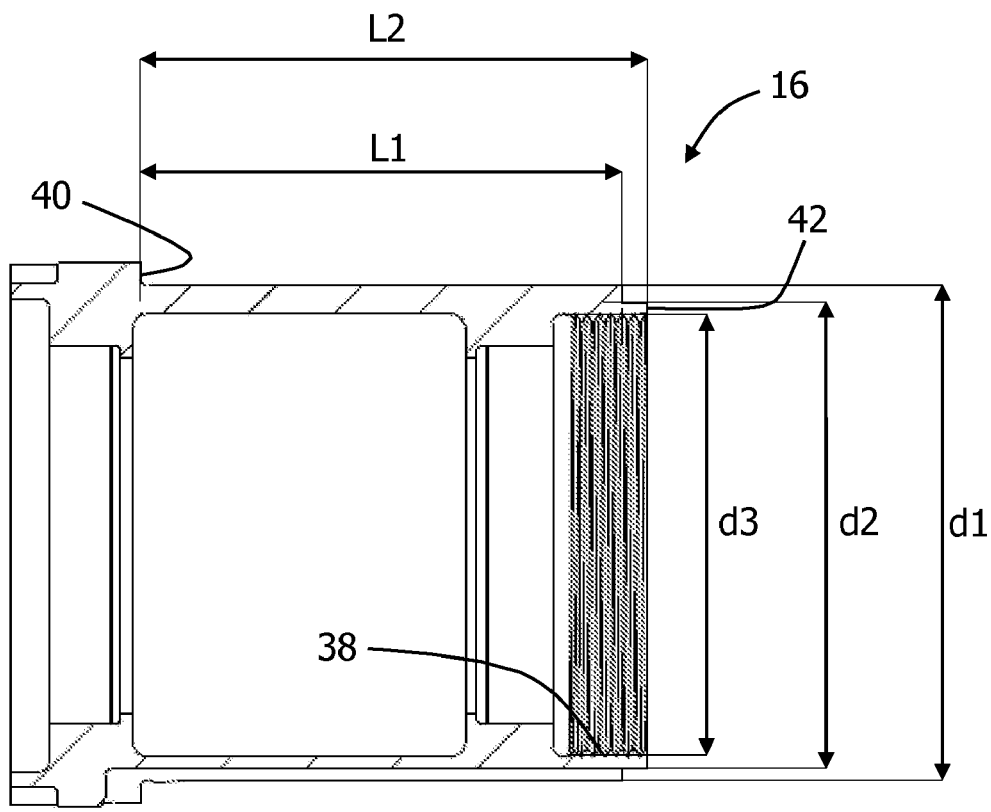
Fig. 5a
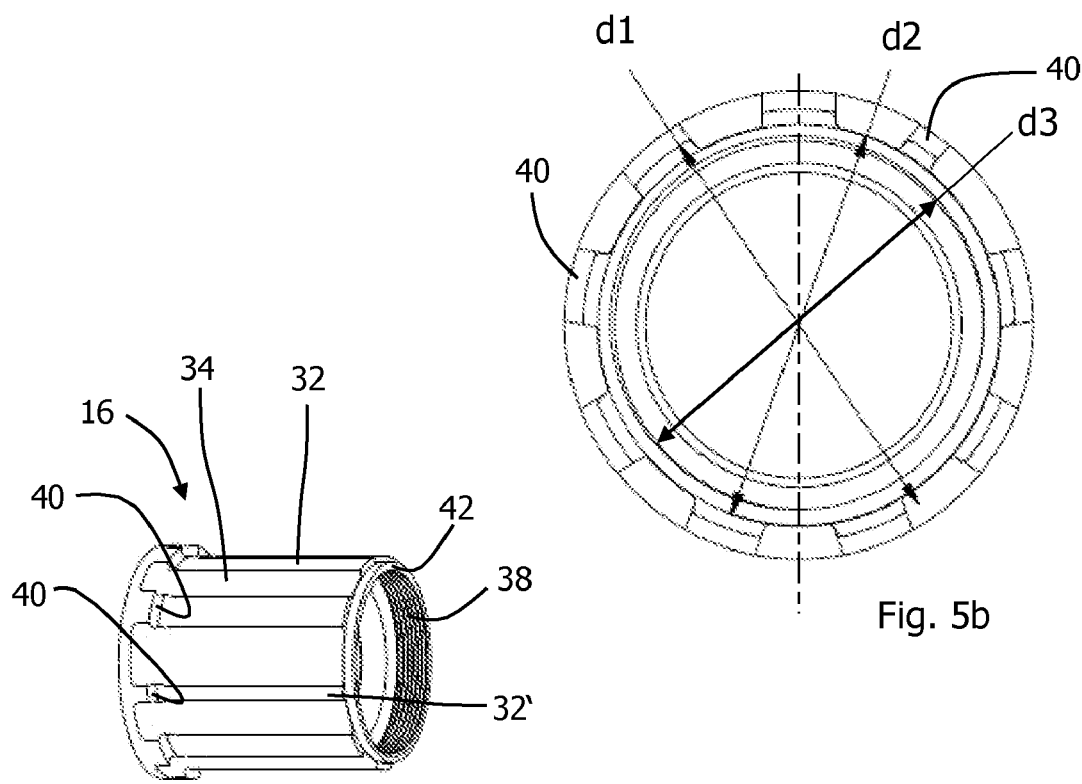
Fig. 5b
Fig. 5c

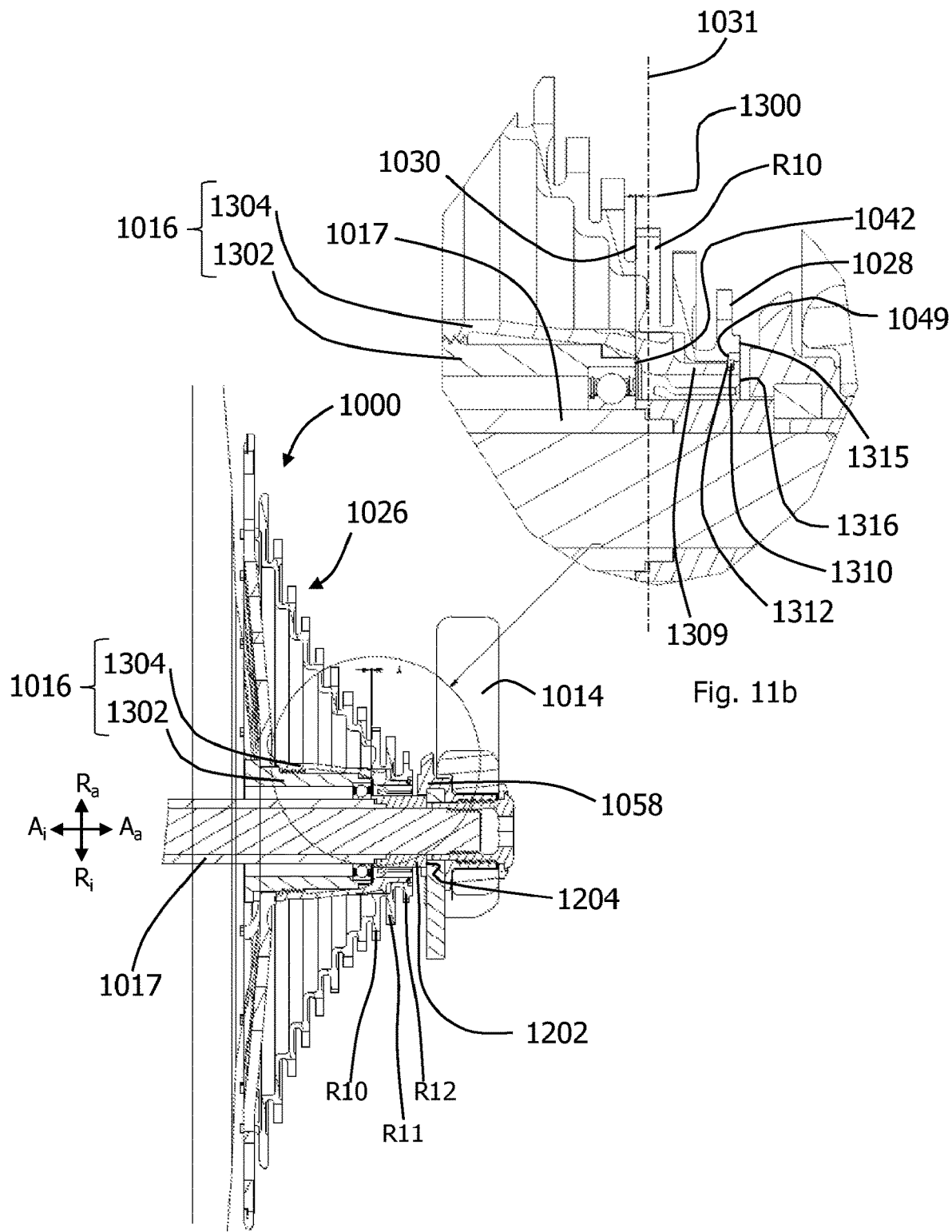

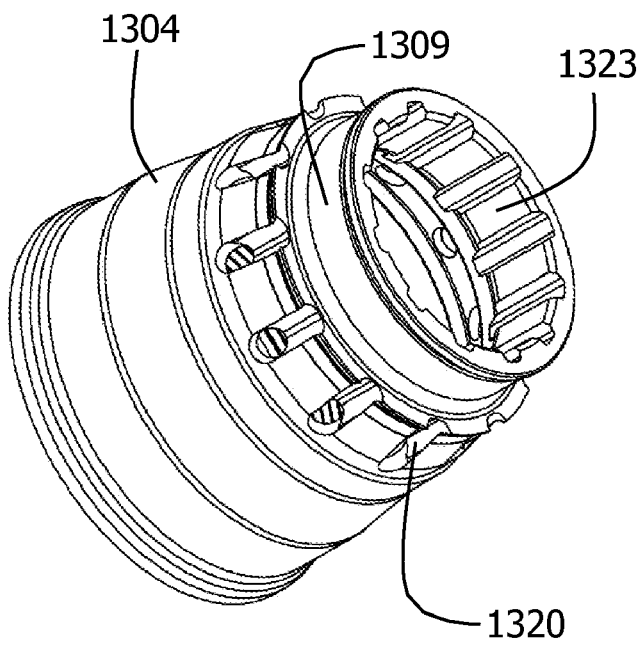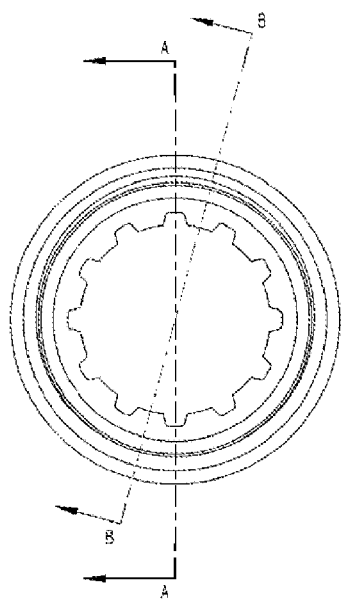
Fig. 13a
Fig. 13b
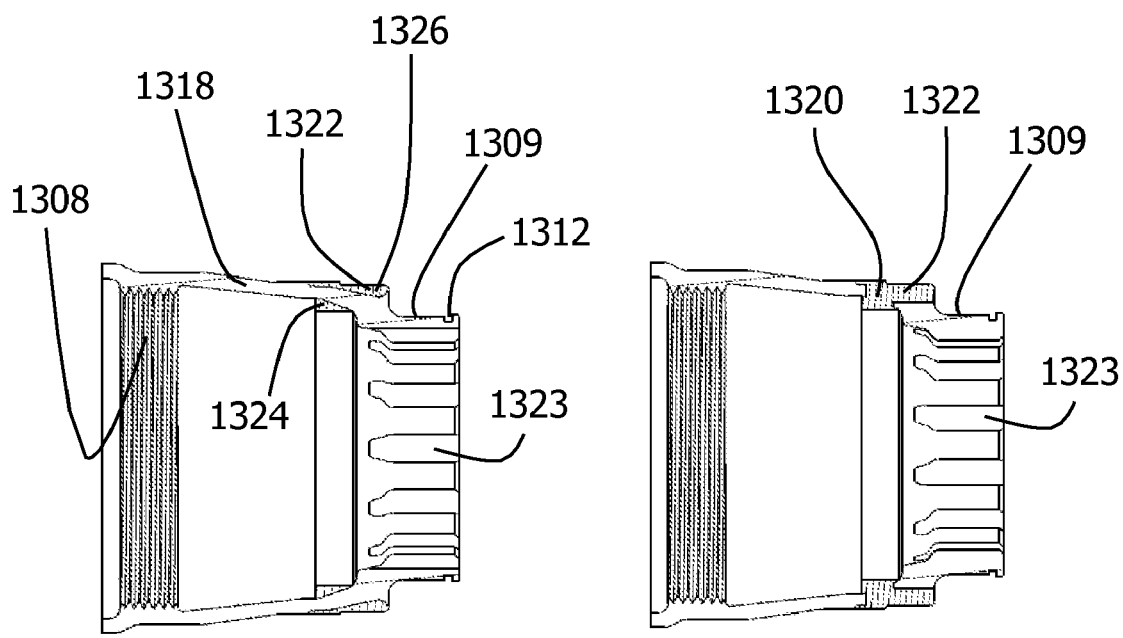
A-A
B-B
Fig. 13c
Fig. 13d

MULTI-SPROCKET ARRANGEMENT FOR A REAR WHEEL ASSEMBLY FOR A BICYCLE, AND REAR WHEEL ASSEMBLY

PRIORITY

This application claims priority to, and/or the benefit of, German patent application No. DE 10 2020 005 373.4, filed on Sep. 1, 2021, the contents of which are included by reference herein in their entirety.

FIELD OF THE DISCLOSURE

The present disclosure relates to a multi-sprocket arrangement for a rear wheel assembly for a bicycle with a derailleur system, which multi-sprocket arrangement is provided for installation on a rear wheel hub of a bicycle. Furthermore, the disclosure relates to a rear wheel assembly for a bicycle with a derailleur system with a multi-sprocket arrangement. In addition, the disclosure relates to a rear wheel assembly and a bicycle frame for a bicycle with a derailleur system, in which the rear wheel assembly is attached to the rear wheel hub and the rear wheel hub is connected to the bicycle frame.

BACKGROUND

A rear wheel assembly for a bicycle with a derailleur system typically comprises a multi-sprocket arrangement which is coupled or can be coupled to the rear wheel hub via a driver. The driver is in engagement in a torque-transmitting manner with the rear wheel hub via a freewheeling clutch and permits torque to be transmitted in the one direction of rotation (the driving direction), whereas the driver is rotationally decoupled in the other direction from the rear wheel hub via a freewheeling mechanism. In the assembly state of the rear wheel assembly with the bicycle frame, the rear wheel hub is connected to a rear wheel axle which is attached at its opposite ends to a respective dropout of a bicycle frame. The bicycle frame thus defines an installation width between its two dropouts and the internal distance therebetween for all components to be fastened to the rear wheel hub, such as a wheel, a driver, a multi-sprocket arrangement, a hub end cap and optionally further components, for example, for attaching a rear derailleur.

In recent years, derailleur systems in which only a single sprocket is provided in the region of the pedal crank have become ever more established. This development is associated with the more widespread use of motor-assisted bicycles. However, it was initiated by the concept of eliminating a weight-intensive arrangement of a plurality of sprockets with an associated front derailleur. This development has made it necessary to provide a greater transmission ratio spread by providing a sufficiently large number of gears on the rear multi-sprocket arrangement (cassette). However, because of the limited installation width and the specified width of commercially available chains, the increasing requirement for more gears and consequently for more sprockets cannot be easily resolved by adding as many sprockets as desired to the multi-sprocket arrangement. The available construction space (installation width) is up against the width of conventional chains and the corresponding width of the individual sprockets as a limiting factor. In order, nevertheless, to obtain an improved transmission ratio with a limited number of sprockets, it is endeavored to increase the transmission range between the largest and the smallest sprocket. It is particularly important for the user in professional cycling or in recreational cycling to have available both as small a gear as possible (largest sprocket) and as large a gear as possible (smallest sprocket) in order, firstly, to be able to comfortably ride up steep slopes and, secondly, to achieve a high speed at the same pedaling frequency. The intermediate sprockets of the multi-sprocket arrangement accordingly have to be coordinated with one another. Large transmission jumps between adjacent sprockets are possible, but should generally be avoided.

In conventional solutions, the geometry of the driver imposes limits on the endeavour to provide small sprockets for as large a gear as possible. The sprockets are conventionally fastened to the radial outer circumference of the driver, as a result of which a minimum inner diameter (root circle) of the sprockets is already predetermined by the outer diameter of the driver. When using drivers that are widely available on the market, the geometry of the driver means that it is still only possible to attach a smallest sprocket with eleven teeth to the sprocket arrangement.

There is nevertheless a need in cycling for very small sprockets, i.e. sprockets with ten or fewer teeth. To meet this demand, there are approaches in the prior art for using a novel driver which differs from the first type of driver and, by suitable structural measures, permits the attachment of a sprocket with a number of teeth less than eleven. However, such special solutions are more costly in comparison to standard solutions because of the lower manufacturing numbers and, in addition, are generally incompatible with already customary components of a rear wheel assembly and the commercially available drivers. Furthermore, such special solutions can be difficult to place on the market.

Such a driver designed especially for receiving smaller sprockets is known from document EP 1 342 657 B1. The driver has a first tubular element which can be fastened to the bicycle hub with a freewheeling mechanism. A second tubular element with a smaller diameter can be coupled to the axially outer end of the first tubular element. The second tubular element has an outer diameter which is smaller than that of the first tubular element and which enables a sprocket with ten teeth to be fastened and radially supported thereon. One exemplary embodiment shows the reception and the radial support of three sprockets on the second tubular element.

A further possibility for using two sprockets with an inner diameter which is smaller than an outer diameter of the driver is shown in laid-open application DE 10 2017 004 853 A1. The two sprockets with the smaller diameter are connected to one another via a first shaft portion and by a further shaft portion to a smallest sprocket arranged on the driver and are secured against axial displacement by a locking element. The locking element has an outer diameter which permits the locking element to engage in a radially inner region of the driver. In one exemplary embodiment, the two sprockets with the smaller inner diameter are formed in a self-supporting manner.

SUMMARY

This disclosure is based on the object of providing a multi-sprocket arrangement which is simplified in relation to the solutions from the prior art and, with better use of the predetermined installation width, can also be coupled to conventional types of drivers.

According to a first aspect, a multi-sprocket arrangement provided for a rear wheel assembly for a bicycle with a derailleur system has an axis of rotation and is configured be to rotatably coupling to a driver of the rear wheel assembly.

The multi-sprocket arrangement comprises at least eleven sprockets with differing numbers of teeth, wherein each sprocket has an inner side surface and an outer side surface in the region of the teeth, and a sprocket center plane lying between the inner side surface and the outer side surface and extending orthogonally with respect to the axis of rotation. The multi-sprocket arrangement is configured such that, in the mounted state, at least two sprockets with the smallest numbers of teeth are formed in a radially self-supporting manner and are coupled to the driver via at least one further sprocket with a greater number of teeth, and the three sprockets with the smallest number of teeth are arranged in such a manner that a sprocket center plane of the sprocket with the third smallest number of teeth runs in the region of an axial end surface of the driver or axially outside the driver.

BRIEF DESCRIPTION OF DRAWINGS

Exemplary embodiments of the disclosure will be explained in more detail below with reference to the attached schematic drawings, in which:

FIG. 3 shows a view from the rear of a rear wheel assembly which comprises a multi-sprocket arrangement according to a first embodiment and a first type of driver;

FIGS. 4a-b show a side view of the rear wheel assembly, which is fastened to the frame, according to FIG. 3 (FIG. 4a) and a side view of the derailleur hanger illustrated in FIG. 3 (FIG. 4b);

FIGS. 5a-c show the first type of driver of the rear wheel assembly in cross section (FIG. 5a), in a front view (FIG. 5b) and as a perspective view (FIG. 5c), which first type of driver can be coupled to the multi-sprocket arrangement according to the first embodiment;

FIGS. 11a-b show a sectional view through a rear wheel assembly which comprises a multi-sprocket arrangement according to the third embodiment and the third type of driver (FIG. 11a), and an enlarged detail of the rear wheel assembly (FIG. 11b);

FIGS. 13a-d show a receiving body of the third type of driver in a perspective view (FIG. 13a), a front view (FIG. 13b) and in two different sectional illustrations (FIGS. 13c and 13d) according to the intersecting lines illustrated in FIG. 13b;

DETAILED DESCRIPTION

Figure 1:
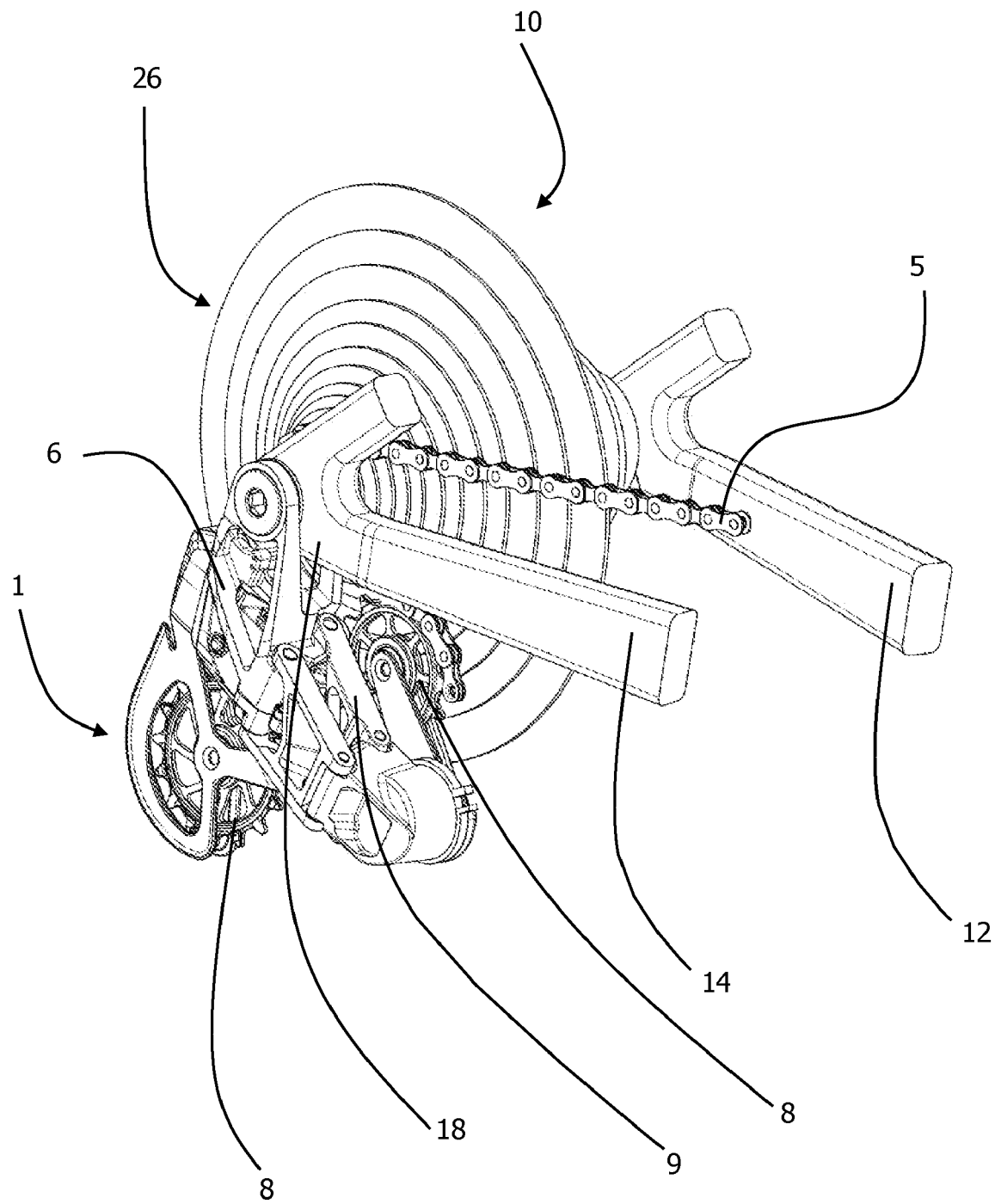
FIG. 1 shows a perspective view of a rear wheel assembly, arranged between two frame portions, according to one embodiment and of a rear gearshift mechanism arranged on one of the frame portions.

This disclosure is based on the object of providing a multi-sprocket arrangement which is simplified in relation to the solutions from the prior art and, with better use of the predetermined installation width, can also be coupled to conventional types of drivers.

According to an embodiment, a multi-sprocket arrangement provided for a rear wheel assembly for a bicycle with a derailleur system has an axis of rotation and is configured be to rotatably coupling to a driver of the rear wheel assembly. The multi-sprocket arrangement comprises at least eleven sprockets with differing numbers of teeth. Each sprocket has an inner side surface and an outer side surface in the region of the teeth, and a sprocket center plane lying between the inner side surface and the outer side surface and extending orthogonally with respect to the axis of rotation.

A sprocket center plane is understood as meaning a plane which runs orthogonally with respect to a center axis of the rear wheel hub and through the sprocket, preferably through the radially outermost sprocket tip. A distance of the sprocket center plane from the two axial side surfaces of the sprocket may be identical in size. The two side surfaces of a sprocket are referred to as inner side surface and outer side surface. In the assembly state of the rear wheel assembly with the bicycle frame, the inner side surface faces in the direction of a bicycle center plane which runs orthogonally with respect to the axis of rotation of the multi-sprocket arrangement and through a center point between the frame dropouts of a bicycle frame. The outer side surface of the sprocket is arranged opposed to the inner side surface and faces in the direction of the rear frame dropout of the bicycle frame, which rear frame dropout is closer to the driver in the assembly state.

In the mounted state, the multi-sprocket arrangement is designed in such a manner that at least two sprockets with the smallest numbers of teeth are formed in a radially self-supporting manner, i.e. are not supported radially thereon, and are coupled to the driver via at least one further sprocket with a larger number of teeth. In an embodiment, the three sprockets with the smallest numbers of teeth are arranged in such a manner that the sprocket center plane of the sprocket with the third smallest number of teeth of the multi-sprocket arrangement runs in the region of an axial end surface of the driver or axially outside the driver. In an embodiment, at least two sprockets are thus arranged completely, and a further sprocket at least partially, between the axial end surface of the driver and the rear dropout of the bicycle in the mounted state. In general, in the mounted state, the multi-sprocket arrangement is coupled to the driver such that torque can be transmitted from the multi-sprocket arrangement to the driver.

The solution according to the disclosure makes provision for the three smallest sprockets, i.e. the three sprockets with the smallest numbers of teeth, of the multi-sprocket arrangement to be arranged axially outside the driver in the mounted state in such a manner that at least the sprocket center plane of the third smallest sprocket lies outside the axial end surface of the driver or geometrically coincides precisely with the axial end surface. The effect which can be achieved by this is that at least the two smallest sprockets, i.e. at least the two sprockets with the smallest numbers of teeth, are arranged completely axially outside the driver, i.e. lie in front of the latter, and therefore the outer diameter of the driver should no longer be taken into consideration as a limiting factor at least for the two smallest sprockets. The smallest sprockets of the multi-sprocket arrangement can thereby be designed to be smaller than has hitherto been possible in the prior art. A further effect which can be achieved by this is that, in most of the gears, the bicycle chain, which runs between the front sprocket and the cassette, takes up a smaller skew with respect to the longitudinal direction of the bicycle than in the prior art. This results in greater running smoothness and in lower wear of the components of the drive assembly.

In general, the details "smallest sprocket", "second smallest sprocket" and "third smallest sprocket" relate to a respective sprocket of the multi-sprocket arrangement with the smallest, second smallest and third smallest number of teeth.

In the mounted state, according to an embodiment, at least the three sprockets with the smallest numbers of teeth are arranged in such a manner that a sprocket inner plane of the sprocket with the third smallest number of teeth, the sprocket inner plane running along the inner side surface, runs in the region of an axial end surface or axially outside the driver. In other words, in this embodiment, in the mounted state the sprocket inner plane of the third smallest sprocket coincides with the axial end surface of the driver or is even arranged axially outside the driver. In this embodiment, at least three sprockets are arranged completely between the axial end surface of the driver and the rear dropout of the bicycle. The effect which can be achieved by this is that the effects previously mentioned, such as greater running smoothness and lower wear of the components of the drive assembly, can be increased further.

In an embodiment, the axially outer end side of the driver runs orthogonally with respect to the axis of rotation in a plane. The end side of the driver should preferably be considered to be that side which both runs orthogonally with respect to the axis of rotation and forms a driver surface protruding the furthest axially outwards.

According to an embodiment, the rear wheel assembly is configured in such a manner that torque is transmitted by the sprocket with the smallest number of teeth via an adjacent sprocket with the second smallest number of teeth to the sprocket with the third smallest number of teeth and by the latter to the driver. In other words, the three smallest sprockets are connected in a torque-transmitting manner to one another in the mounted state.

In one embodiment, for example, the two sprockets with the smallest numbers of teeth can be connected releasably or detachably to each other in the mounted state, for example by the sprockets engaging in each other with complementary torque-transmitting structures (spur toothing, etc.) and determining a predefined rotational orientation of the two sprockets with respect to each other. For example, a releasable connection is provided, such as an engagement of the sprockets by latching teeth on one sprocket and corresponding recesses on the directly adjacent sprocket. A predetermined rotational orientation can be achieved, for example, by one of the latching teething and the corresponding recess having a different dimensioning from the others, and therefore precisely this one latching tooth can engage only in this one recess assigned thereto. Adjustability of the rotational orientation of tooth formations on the sprockets can result in easy gearshift operations, which increases the riding comfort.

Alternatively, according to a further embodiment, the two sprockets with the smallest numbers of teeth can be connected nonreleasably to each other in the mounted state. A nonreleasable connection can take place in an integral formation or in a separate formation by use of a joining method, for example by welding, adhesive bonding or the like. A further alternative can also be the use of 3D printing technologies with which two or more sprockets are printed together as an integral component. In such a 3D printing method, the sprockets can be released, for example, only by being destroyed. The two sprockets can also be produced integrally by other methods, such as a machining method, e.g. turning.

In order to permit engagement of the chain links, adjacent sprockets of the multi-sprocket arrangement can be spaced apart from one another axially and, in addition, can be connected or connectable to one another via connectors. A flange portion extending parallel to the rear wheel axle, or a retaining pin, can be provided as the means of connecting the sprocket to an adjacent sprocket. The flange portion can be, for example, a ring element. These connectors can extend between two facing sprocket surfaces. Alternatively, all or some of the sprockets of the multi-sprocket arrangement can be formed integrally with the connectors. In both alternatives, a distance between the sprockets can be determined by the connectors. The connectors can also be configured in such a manner that they can transmit a torque between the sprockets connected thereto. The connectors can be arranged on the inner circumference of the sprocket of the sprockets to be connected and having the smaller or the larger diameter. For example, an inner diameter of at least one of the sprockets connected thereto can thus be determined. Furthermore, it is also possible for adjacent sprockets to have the same inner diameters. For example, the two sprockets with the smallest numbers of teeth can both have the same inner diameter.

The above-claimed arrangement of at least two sprockets in front of the driver makes it possible for the two sprockets, preferably three sprockets, with the smallest numbers of teeth to straddle the driver at least in sections on the end side, i.e. to be arranged in front of the driver, when viewed in the axial direction, and to cover the latter at least in sections in this viewing direction. The discussed straddling of the driver preferably also takes place by means of a sprocket which is attached to the driver directly or indirectly in a torque-transmitting manner.

According to a development of the invention, the at least two radially self-supporting sprockets can be fixed axially in the mounted state against an axial displacement in relation to the driver. For this purpose, a locking element can be provided which is designed, for example, as a locking screw and is suitable for engaging with an external thread in an internal thread of the driver.

To achieve as space-saving an arrangement of the locking element as possible, it is proposed, according to an embodiment, that the sprocket with the smallest number of teeth on its outer side surface has an axial and radial, preferably annular, cut-out which is designed for axially and radially receiving at least a portion of the locking element. At one axial end, the locking element can have a projection or a flange which, in the mounted state, completely or partially engages in the cut-out. Accordingly, the projection and the sprocket with the smallest number of teeth can end axially flush. Alternatively, the projection can partially protrude axially out of the cut-out, and thus out of the sprocket with the smallest number of teeth, for example can protrude by a maximum of 2 mm, preferably a maximum of 1.7 mm. For example, the projection can protrude 1.55 mm+/−0.20 mm from the cut-out.

According to one embodiment, an inner diameter of the sprocket with the smallest number of teeth can be identical to or smaller than an internal thread diameter of an internal thread of the driver, which internal thread is designed for receiving an external thread of a locking element. The threads discussed constitute one possible connection of the locking element to the driver, as a result of which the at least two self-supporting sprockets are fixed axially.

In general, threaded connections do not permit an exact angular positioning of the elements screwed to one another, especially not in the case of products manufactured in large numbers. Added to this is the fact that, in bicycle technology, the components are sometimes released from one another for maintenance or repair purposes, which further complicates an exact angular repositioning of the individual threaded connections with respect to one another once reassembled. A predetermined angular positioning of the sprockets with respect to one another in the mounted state is desirable, however, specifically in high-priced bicycle gearshift systems in order to ensure that the bicycle chain shifts between the sprockets smoothly and barely noticeable by the cyclist, in order thereby to ensure as continuous a transmission of torque as possible. When the locking element has a threaded connection to the driver, it is therefore provided, according to an embodiment, that the rotational orientation of the at least two sprockets arranged in front of the driver is independent of the threaded position. According to an embodiment, it is therefore proposed that at least the smallest sprocket is rotatable relative to the locking element. Alternatively, the at least two smallest sprockets can also be rotatable relative to the locking element. In this way, the rotational orientation of the smallest sprocket, preferably the at least two smallest sprockets, can be adjustable in relation to sprockets with larger numbers of teeth irrespective of the threaded position between locking element and driver. For example, the rotational orientation of the smallest sprocket, preferably the at least two smallest sprockets, can be secured by suitable securing means before, during or after the connection of the locking element and driver. By means of the defined rotational orientation of two adjacent sprockets with respect to each other, the tooth formations thereof are oriented relative to one another such that the bicycle chain is easily released from the engagement with one sprocket and enters into engagement with an adjacent sprocket, i.e. the gear shifting runs smoothly.

The multi-sprocket arrangement according to the disclosure makes it possible, according to an embodiment, for the multi-sprocket arrangement to comprise at least twelve sprockets. The multi-sprocket arrangement may even comprise at least thirteen sprockets. The largest sprocket can have at least 48 teeth, in particular 50, 51 or 52 teeth. The smallest sprocket can have ten teeth. Even smaller sprockets with fewer than ten teeth, for example nine or eight teeth, are possible according to the invention. The minimum number of teeth is limited by the minimum possible inner diameter of the smallest sprocket in conjunction with the chain which is used.

According to a further aspect, a multi-sprocket arrangement provided for a rear wheel assembly for a bicycle with a derailleur system has an axis of rotation and is designed for non-rotatable coupling to a driver of the rear wheel assembly. The multi-sprocket arrangement comprises at least eleven sprockets with differing numbers of teeth. Each sprocket has an inner side surface and an outer side surface in the region of its teeth and a sprocket center plane lying between the inner side surface and the outer side surface and running orthogonally with respect to the axis of rotation.

In particular, this multi-sprocket arrangement is designed in such a manner that it is coupled or can be coupled to a first type of driver. The multi-sprocket arrangement here is designed in such a manner that, in the mounted state, with an axial length of the first type of driver from a driver stop to an axially outer end side in a range from 34.5 mm to 35.9 mm, preferably 34.9+/−0.3 mm, the following applies: a first distance in the axial direction from the driver stop to the outer side surface of the sprocket with the smallest number of teeth is greater than 38 mm. For even better use of the available installation width, the first distance is preferably greater than 39.1 mm, even more preferably 39.9+/−0.2 mm. Alternatively or additionally, in the case of the first type of driver, a second distance in the axial direction from the axially outer end side of the first type of driver to an outer side surface of the sprocket with the smallest number of teeth is greater than 4.0 mm, preferably 5.0+/−0.2 mm. That end side of the driver which, in the mounted state, lies closer to the sprocket with the smallest number of teeth can be referred to as the axially outer end side of the driver.

The first type of driver that is widespread in the prior art and on the market is sold, for example, under the name Hyperglide® driver or HG driver for short.

According to one embodiment, the first type of driver, at a first region of its radial outer surface, can have a driver profile which is arranged along a first axial length from the driver stop in the outside direction. The driver profile can be provided to enter into engagement with a complementary profile on an inner circumferential surface of the multi-sprocket arrangement. The driver profile can comprise driver protrusions or what are referred to as splines which can be arranged distributed over the circumference of the radial outer surface of the driver. At least one of the driver protrusions or splines can differ from the others; it can be, for example, configured to be wider or less wide in the circumferential direction, with a complementary profile interacting therewith then having to have a corresponding complementary geometry. This makes it possible to be able to ensure a desired rotational orientation of the sprockets, which are fastened thereto, of the multi-sprocket arrangement. The driver profile can comprise 8, 9 or 22 driver protrusion/splines, with 9 or more splines being preferred.

Furthermore, according to an embodiment, in the case of the first type of driver the first axial length can be smaller than a second axial length which extends from the driver stop to the axially outer end side of the driver. The first type of driver can be free of the driver profile at a second region of its radial outer surface, which region is adjacent to the axially outer end side, for example in the form of a smooth circular-cylindrical outer circumferential surface. In addition, the first type of driver can have an opening which extends radially outwards from a driver center axis and axially inwards from the axially outer end side of the driver. The opening can have an internal thread on its radial inner surface.

The above-discussed locking element can be screwed, for example, with its external thread into the internal thread of the first type of driver. This results in a particularly simple and reliable installation option.

In a further embodiment, the first axial length of the first type of driver, along which the driver profile is arranged on the driver, from the driver stop to the end of the driver profile is greater than 32.9 mm, preferably 33.2 mm. Alternatively or additionally, the second axial length of the driver from the driver stop to the end side of the driver is greater than 34.2 mm, preferably 34.9+/−0.2 mm.

Furthermore, the outer diameter of the first type of driver determines the minimum inner diameter of the sprockets to be received thereon. Preferably, the first outer diameter of the first type of driver in the first region along the first axial length of the first type of driver is greater than 34.2 mm, preferably 34.5+/−0.15 mm. Alternatively or additionally, a second outer diameter of the first type of driver in the second region which is adjacent to the end side of the first type of driver is greater than 31.4 mm, preferably 32.1+/−0.2 mm. In a further alternative or in addition to the indicated diameters, a first outer diameter of the internal thread of the first type of driver axially adjacent to its end side is greater than 29.8 mm, preferably 30.6+/−0.2 mm. The discussed outer diameter is also referred to as the nominal diameter. A preferred pitch of the internal thread of the first type of driver is 24 TPI, and therefore the thread can also be characterized according to the known dimensioning as M 30.6×24 TPI.

Features of the multi-sprocket arrangements according to the above-explained aspects and exemplary embodiments can be combined with one another.

According to another embodiment, a multi-sprocket arrangement provided for a rear wheel assembly for a bicycle with a derailleur system has an axis of rotation and said multi-sprocket arrangement is designed for non-rotatable coupling to a driver of the rear wheel assembly. The multi-sprocket arrangement comprises at least eleven sprockets with differing numbers of teeth. Each sprocket has an inner side surface and an outer side surface in the region of its teeth and a sprocket center plane lying between the inner side surface and the outer side surface and running orthogonally with respect to the axis of rotation.

In particular, this multi-sprocket arrangement is designed in such a manner that it is coupled or can be coupled to a second type of driver. The multi-sprocket arrangement here is designed in such a manner that, in the mounted state, with an axial length of the first type of driver from a driver stop to an axially outer end side in a range from 25 mm to 27 mm, preferably 26.0+/−0.2 mm, the following applies: a first distance in the axial direction from a driver stop as far as the outer side surface of the sprocket with the smallest number of teeth is greater than 34 mm and is preferably 35.0+/−0.2 mm. Alternatively or additionally, the following applies: in the case of the second type of driver, a second distance in the axial direction from the axially outer end side of the second type of driver to an outer side surface of the sprocket with the smallest number of teeth is greater than 8.0 mm, preferably 9.0+/−0.2 mm.

According to this embodiment, each sprocket has an inner side surface and an outer side surface in the region of its teeth and a sprocket center plane lying between the inner side surface and the outer side surface and running orthogonally with respect to the rear wheel hub. For the definition of the surfaces and plane mentioned, reference is made to the above statements.

The second type of driver which is widespread in the prior art is sold, for example, under the name "micro-spline".

The second type of driver can have, on a first region of its radial outer surface, a driver profile which is arranged along a first axial length from the driver stop in the outside direction. The driver profile can be configured in accordance with the previous statements regarding the first type of driver. The driver profile of the second type of driver can comprise 8, 9 or 22 driver protrusions/splines, with more than 9 splines being preferred. Alternatively, precisely 22 splines are preferred. Also in the case of the second type of driver, the first axial length can be smaller than a second axial length which extends from the driver stop to the end side of the second type of driver. The second type of driver, on a second region of its radial outer surface, which region is adjacent to the end side of the driver, can be free from driver profiles, for example in the form of a circular-cylindrical circumferential surface. In addition, the second type of driver can have an opening which extends radially outwards from a driver center axis and axially inwards from the outer side. The opening can have an internal thread on its radial inner surface.

According to an embodiment, the above-explained locking element can be screwed with its external thread into the internal thread of the second type of driver.

According to one embodiment, the first axial length of the second type of driver, along which axial length the driver profile is arranged on the second type of driver, from the driver stop to the end of the driver profiles is greater than 24.7 mm, preferably 25.7+/−0.2 mm. Alternatively or additionally, the second axial length of the second type of driver from the driver stop to the end side of the second type of driver is greater than 25.0 mm, preferably 26.0+/−0.2 mm.

Furthermore, the outer diameter of the driver determines the minimum inner diameter of the sprockets to be received thereon. Preferably, the first outer diameter of the second type of driver in the first region along the first axial length of the second type of driver is greater than 31.6 mm, preferably 32.60+0.05/−0.1 mm. The first outer diameter is determined by the radial extent of the driver profiles. The diameter of the basic surfaces connecting the driver profiles can be reduced by the height of the driver profiles and can preferably be 30.1+/−0.2 mm. Alternatively or additionally, a second outer diameter of the second type of driver in the second region which is adjacent to the axially outer end side of the driver is greater than 28.5 mm, preferably 29.5+/−0.1 mm. In a further alternative or additionally to the indicated diameters, a first nominal diameter of the internal thread of the second type of driver is greater than 25.2 mm, preferably 26 mm+/−0.2 mm, axially adjacent to its end side.

According to a further aspect of the invention, a multi-sprocket arrangement provided for a rear wheel assembly for a bicycle with a derailleur system has an axis of rotation and the multi-sprocket assembly is designed for coupling, for conjoint rotation, to a driver of the rear wheel assembly. The multi-sprocket arrangement comprises at least eleven sprockets with differing numbers of teeth, wherein each sprocket has an inner side surface and an outer side surface in the region of its teeth and a sprocket center plane lying between the inner side surface and the outer side surface and running orthogonally with respect to the axis of rotation.

In particular, this multi-sprocket arrangement is designed in such a manner that it is coupled or can be coupled to a third type of driver. The multi-sprocket arrangement here is designed in such a manner that, in the mounted state, with an axial length of the first type of driver from a driver stop to an axially outer end side in a range from 28.5 mm to 30.5 mm, preferably 29.5+/−0.2 mm, the following applies: a first distance in the axial direction from the driver stop as far as the outer side surface of the sprocket with the smallest number of teeth is greater than 38 mm. An even more favourable use of the available installation width can be achieved if the first distance is preferably greater than 39.1 mm, is even more preferably 39.9+/−0.2 mm. Alternatively or additionally, in the case of the first type of driver, a second distance in the axial direction from the axially outer end side of the first type of driver to an outer side surface of the sprocket with the smallest number of teeth is greater than 9.1 mm, preferably 10.4+/−0.2 mm. The above dimensions of the first and second distance make it possible for the installation width available for the rear wheel assembly to be more effectively used. For example, a multi-sprocket arrangement with more sprockets can be used, or the multi-sprocket arrangement can be placed axially further on the outside to reduce the chain skew.

For the definition of the mentioned surfaces and planes, reference is made to the preceding embodiments. This embodiment relates to a multi-sprocket arrangement which is coupled or can be coupled to drivers differing from the first and the second type of driver and is referred to below as the third type of driver.

The third type of driver is understood as meaning a driver sold, for example, under the name XD™ Driver Body.

According to a further embodiment, the third type of driver is of multi-part design and, in one embodiment, comprises a driver body and a receiving body. The driver body can have an external thread on a region of its outer circumferential surface that is adjacent to the driver stop. The receiving body, on its inner circumferential surface, can have an internal thread which is designed to engage in the external thread of the driver body.

In the mounted state of the multi-part driver, the receiving body can be arranged radially outside the driver body and can extend with its axially outer end portion axially outwards over the driver body. An inner diameter of the axially outer end portion of the receiving body can be smaller than an outer diameter of the driver body.

In one embodiment, the multi-part driver of the third type of driver is part of a rear wheel assembly and the third type of driver is coupled or can be coupled to the multi-sprocket arrangement. Preferably, at least two sprockets of the multi-sprocket arrangement that have the smallest numbers of teeth are arranged in a radially self-supporting manner axially on the outside in front of the driver body. The receiving body can extend radially within the at least two sprockets and can fix the sprockets against an axial displacement.

In order to axially fix the multi-sprocket arrangement, the receiving body can have, on its axially outer end portion, a groove which is designed for receiving a securing element, for example in the form of a ring element. In the assembled state of the third type of driver, the securing element can be received in the groove and can be in engagement with a cut-out in the multi-sprocket arrangement, preferably in the sprocket with the smallest number of teeth.

Furthermore, in the mounted state, the axially outer end side of the multi-sprocket arrangement, preferably an outer side surface of the sprocket with the smallest number of teeth, can end flush with an axial end side of the receiving body. Alternatively, the axial end side of the receiving body can protrude by a maximum of 0.9 mm from the multi-sprocket arrangement.

For transmitting torque from the multi-sprocket arrangement to the third type of driver, the driver body can have a driver profile on its outer circumferential surface which is arranged adjacent to its driver stop. The driver profile can engage in a complementary profile of the multi-sprocket arrangement. For example, the driver profile is designed in such a manner that it merely engages in a complementary profile of the largest sprocket of the multi-sprocket arrangement. The driver profile can comprise 8, 9 or 22 driver protrusions/splines, with 9 or more splines being preferred.

The receiving body can be arranged radially outside the driver body. It can deviate from the cylindrical geometry of the driver body and can taper axially outwards. The radial dimension of the receiving body is therefore as small as possible, especially in a region adjacent to the smaller sprockets, where sprockets with smaller inner diameters can be arranged. The inner diameter or outer diameter of the receiving body can taper conically in the region between its internal thread and its protruding, axially outer end portion.

In one embodiment, the receiving body is provided in one region with a thermoplastic, for example polyoxymethylene (POM), or an elastomer. For example, the thermoplastic or the elastomer can be injected as a positioning body onto the receiving body. The region provided with plastic or elastomer can serve for axially and radially positioning the receiving body in relation to the driver body. In the mounted state of the driver, the positioning body can be provided in the region of the interface between the receiving body and the driver body, i.e. the driver body interface, and also in the region of the interface between the driver body and the multi-sprocket arrangement, i.e. the multi-sprocket arrangement interface. The positioning body can annularly encase the two interfaces and can lie both against an outer circumferential surface and against an inner circumferential surface of the receiving body.

The receiving body interface can preferably be arranged further radially on the inside than the multi-sprocket arrangement interface. There can be an axial offset between the interfaces. This has the advantage that manufacturing tolerances of the thermoplastic or elastomer do not act uniformly on the two interfaces. On the contrary, the interfaces can thereby be spatially separated from each other and therefore decoupled in a certain way.

For the installation of the receiving body on the driver body, the receiving body can have a tool interface on its radial inner surface, preferably on its axially outer end portion.

In the event of a malfunction of a bicycle, it may happen that the chain becomes detached from the sprockets and moves in the direction of the smallest sprocket of the multi-sprocket arrangement. In an unfavourable situation, during the operation, the chain may in this case become jammed between the receiving body and the rear dropout of the frame and may then be difficult to release from said jam. To prevent this unfavourable situation, the multi-part driver can comprise a chain drop guard which is fastened or can be fastened to the receiving body or to the multi-sprocket arrangement. The chain drop guard can have a projection radially outwards. The radially outer surface of the projection of the chain drop guard can be an oblique surface which, in the mounted state, drops in the direction of the sprocket with the smallest number of teeth.

In the mounted state, the projection can have an outer diameter which is smaller than an outer diameter of the sprocket with the smallest number of teeth. In order to fasten the chain drop guard, the latter can comprise elastic fastening elements which are designed to engage radially on the inside in the receiving body or the multi-sprocket arrangement. For example, the elastic holding elements of the chain drop guard can engage in the tool interface of the receiving body. It should be pointed out that the third type of driver is configured with the above-defined distances in such a manner that there is still sufficient construction space for the chain drop guard when the third type of driver is used in a rear wheel assembly.

According to the above-explained exemplary embodiments, all of the aforementioned driver profiles comprise profiles with what are referred to as driver protrusions or splines on their outer circumference. Splines are understood as meaning in particular wedge-shaped elevations on the outer circumferential surface of the respective driver. Splines can predominantly extend in the axial direction. There are preferably fewer than ten splines, preferably fewer than nine splines. The splines can have different dimensions in terms of their height or/and width or/and length.

According to a further aspect, the disclosure relates to a rear wheel assembly for a bicycle with a derailleur system, which comprises a rear wheel hub which can be arranged between two opposite frame portions of a bicycle frame, a driver which is attached rotatably to the rear wheel hub, and a multi-sprocket arrangement, which is coupled or can be coupled to the driver for conjoint rotation, according to one of the previously described embodiments.

According to the prior art, use is made of hub end caps in order to set an axial rear wheel hub play. Such a hub end cap can also comprise the rear wheel assembly according to the present disclosure which, in the assembly state of the rear wheel assembly on the rear wheel hub, is arranged axially adjacent to the driver in the outside direction. Furthermore, the rear wheel assembly can comprise a further hub end cap which is arranged on the rear wheel hub adjacent to the frame portion further away from the driver. A hub end cap distance between two axially outer end sides of the hub end caps, i.e. between the two axially averted end sides of the hub end caps, can be at least 142 mm, is preferably at least 148 mm and is even more preferably at least 157 mm. The discussed distance between the hub end caps is also referred to as the installation width. That is to say, if, in this disclosure, an installation width is mentioned, this refers to the hub end cap distance.

A third distance between the driver stop and an axially outer end side of the hub end cap can be greater than 42.5 mm, and can preferably be 44.1+1.0/−0.3 mm, when the rear wheel assembly comprises a driver of the first type of driver. In an alternative embodiment, the third distance can be greater than 38.1 mm, and can preferably be 39.7+/−0.2 mm, when the rear wheel assembly comprises a driver of the second type of driver. In a further alternative, the third distance can be greater than 42.5 mm, and can preferably be 44.1+1.0/−0.2 mm, when the rear wheel assembly comprises a driver of the third type of driver.

A further aspect relates to a rear wheel assembly and a bicycle frame for a bicycle with a derailleur system. The rear wheel assembly comprises a rear wheel hub which is arranged between two opposite frame portions of the bicycle, a driver which is attached rotatably to the rear wheel hub and a multi-sprocket arrangement which is coupled or can be coupled to the driver for conjoint rotation and has at least eleven sprockets with differing numbers of teeth.

Each sprocket has an inner side surface and an outer side surface in the region of its teeth and a sprocket center plane lying between the inner side surface and the outer side surface and running orthogonally with respect to the rear wheel hub. For the definition of the surfaces and plane mentioned, reference is made to the statements above.

In the assembly state of the rear wheel assembly and of the latter on the bicycle frame, a fourth distance in the axial direction from the outer side surface of the sprocket with the smallest number of teeth to a circumferential surface at the rear dropout of the bicycle frame, which circumferential surface is adjacent to the rear wheel assembly and is closest thereto, is smaller than 8.2 mm, preferably 7.2+/−0.2 mm, when the rear wheel assembly comprises a driver of the first type of driver. If the rear wheel assembly comprises a driver of the second type of driver, the fourth distance is then smaller than 8.7 mm, preferably 7.7+/−0.2 mm. If the rear wheel assembly comprises a driver of the third type of driver, the fourth distance is then smaller than 8.35 mm, preferably 7.35+/−0.15 mm. For the drivers mentioned, the above distances enable effective use of the installation width available to the rear wheel assembly.

Alternatively or additionally, according to one embodiment, in the assembly state of the rear wheel assembly with the bicycle frame, a fifth distance in the axial direction from the outer side surface of the sprocket with the smallest number of teeth to a recessed surface at the rear dropout of the bicycle frame, which surface is adjacent to the rear wheel assembly and runs orthogonally to the rear wheel hub, is smaller than 12.2 mm, preferably 11.2+/−0.2 mm, when the rear wheel assembly comprises a driver of the first type of driver. If the rear wheel assembly comprises a driver of the second type of driver, the fifth distance is then smaller than 12.7 mm, preferably 11.7+/−0.2 mm. If the rear wheel assembly comprises a driver of the third type of driver, the fifth distance is then smaller than 11.5 mm, preferably 10.55+/−0.15 mm.

The fourth and fifth distance introduced above permit a rear wheel assembly which optimally uses the available construction space (installation width). For this purpose, the multi-sprocket arrangement is shifted axially outwards as far as possible and thus moves closer to the frame dropout. It goes without saying that, given a corresponding arrangement of the driven front chain ring or sprocket of the bicycle, a chain skew can thereby also be reduced.

According to an aspect, in the assembly state of the rear wheel assembly with the bicycle frame, a sixth distance is defined between the outer side surface of the sprocket with the smallest number of teeth and a/the hub end cap, and a space factor which is produced from the quotient of the fifth distance and sixth distance is smaller than 3 and greater than 2.2, preferably between 2.7 and 2.4, even more preferably 2.5. The sixth distance is, for example, 4.2 mm+/−0.2 mm.

Furthermore, a derailleur hanger can be mounted or mountable on the rear dropout of the bicycle frame. A derailleur hanger serves as a guard against damage to the rear gearshift mechanism and to the frame in the event of an action of force on the rear gearshift mechanism, for example in the event of a crash. In one embodiment, in the assembly state of the rear wheel assembly with the bicycle frame, the derailleur hanger mounted on the dropout of the bicycle frame can make contact with the hub end cap such that said derailleur hanger is held at a position in which a rear wheel axle can be guided through the derailleur hanger and the rear wheel hub. The derailleur hanger can furthermore have a structure which serves as a positioning aid for the rear wheel hub.

The disclosure furthermore relates to a method for the installation of a rear wheel assembly. Such a method for the installation of a rear wheel assembly can comprise the following steps: the step of connecting at least two sprockets with the smallest numbers of teeth of a multi-sprocket arrangement to one another, the step of connecting the at least two connected sprockets with a locking screw such that the at least two sprockets are mounted rotatably about a center axis of the locking screw, the step of fastening the locking screw to a driver by an external thread of the locking screw engaging in an internal thread of the driver, the step of aligning the two connected sprockets in relation to sprockets with greater numbers of teeth which are connected to a driver, and the step of fixing the two aligned and connected sprockets by fastening means to a sprocket connected to the driver.

All of the features of the multi-sprocket arrangements and of the rear wheel assembly of the above-explained aspects and embodiments can be combined with one another.

FIG. 1 shows a perspective view of a rear wheel assembly 10 which is arranged between two frame portions 12, 14, wherein a rear gearshift mechanism 1 which is arranged on one of the frame portions 14 is in engagement with a bicycle chain 5. A b-knuckle 6 for fixing the rear gearshift mechanism 1 engages around a frame dropout 18 of the frame portion 14 and is fixed on said frame dropout by means of a plug-in axle 15 which is received in said frame dropout 18 and a frame dropout of the other frame portion 12. A p-knuckle 9 is attached pivotably to the b-knuckle 6, wherein pivoting of the p-knuckle 9 changes at least the axial position thereof in relation to the b-knuckle 6.

The rear wheel assembly 10 comprises a driver 16 (not shown) and a multi-sprocket arrangement 26. For the sake of clarity, the sprockets of the multi-sprocket arrangement 26 are merely illustrated schematically in FIG. 1 by making the respective outer circumferences of the sprockets clear. In the illustration of FIG. 1, the bicycle chain 5 which is driven by a front driving sprocket (not illustrated) is in engagement with a sprocket of the multi-sprocket arrangement 26 and with two chain pulleys 8 of the rear gearshift mechanism 1. It goes without saying that pivoting of the rear gearshift mechanism 1, in particular the p-knuckle 9, changes the position of the bicycle chain 5 in relation to the sprockets, and therefore the bicycle chain 5 can engage in an adjacent next or next but one sprocket.

The figures illustrate rear wheel assemblies 10, 100, 1000 with multi-sprocket arrangements 26, 126, 1026 of various exemplary embodiments, which are provided for a bicycle with a derailleur system. Each rear wheel assembly 10, 100, 1000 comprises a rear wheel hub 17, 1017 which can be arranged between two opposite frame portions 12, 112; 14, 114, 1014 (see FIGS. 2a-b, 11a-b) and a driver 16, 116, 1016 which is attached rotatably to the rear wheel hub. The driver is arranged between the frame portion 14, 114, 1014, preferably the dropout 18, 118, 1018 thereof, and a bicycle center plane 20, 120. In order to define the bicycle center plane 20, 120, 1020, the two frame portions 12, 112; 14, 114, 1014 are used as reference points, wherein the bicycle center plane 20, 120 runs centrally between said frame portions and orthogonally with respect to the rear wheel hub 17, 1017, for example the axis of rotation or longitudinal axis thereof. A rear wheel axle 15, 115, 1015 is guided through the rear wheel hub 17, 1017 in order to fasten the latter to the bicycle frame. The rear wheel axle 15, 115, 1015 is a plug-in axle which is configured for a multi-sprocket arrangement with more than eleven sprockets.

Axial direction details used in this application relate to the bicycle center plane 20, 120 and to the frame portion 14, 114, 1014. A direction axially inwards $A_i$ is defined as the direction towards the bicycle center plane 20, 120, whereas a direction axially outwards $A_a$ is defined as the direction towards the frame portion 14, 114, 1014. The axial directions $A_i$ and $A_a$ are consequently opposed to each other. If, by contrast, a direction radially outwards $R_a$ is mentioned, this is a direction which points away from an axis of rotation 24, 124, 1024 of the multi-sprocket arrangement 26, 126, 1026. A direction radially inwards $R_i$ is opposed to the direction radially outwards $R_a$ and is a direction towards the axis of rotation 24, 124, 1024 of the multi-sprocket arrangement 26, 126, 1026. The axis of rotation 24, 124, 1024 of the multi-sprocket arrangement 26, 126, 1026 runs parallel to the rear wheel hub 17, 1017 and coincides with the axis of rotation or longitudinal axis of the rear wheel hub 17, 1017.

Furthermore, each of the rear wheel assemblies 10, 100, 1000 which are illustrated in the figures has a multi-sprocket arrangement 26, 126, 1026 which is coupled or can be coupled to the driver 16, 116, 1016 for conjoint rotation and has at least eleven sprockets R1-R11 which differ from one another in terms of their numbers of teeth. Each sprocket has an outer side surface 28, 128, 1028 and an inner side surface 30, 130, 1030 in the region of its teeth and a sprocket center plane 31, 131, 1031 lying between the outer side surface 28, 128, 1028 and the inner side surface 30, 130, 1030 and running orthogonally with respect to the rear wheel hub. The outer side surfaces 28 of the sprockets with the three smallest numbers of teeth can be seen for example in the side view of FIG. 4a. The sprocket center plane 31, 131, 1031, as is best made clear in FIG. 7b, can run through the center of the respective sprocket, i.e. can be defined centrally between the outer side surface 28, 128, 1028 and the inner side surface 30, 130, 1030.

Figure 2A:
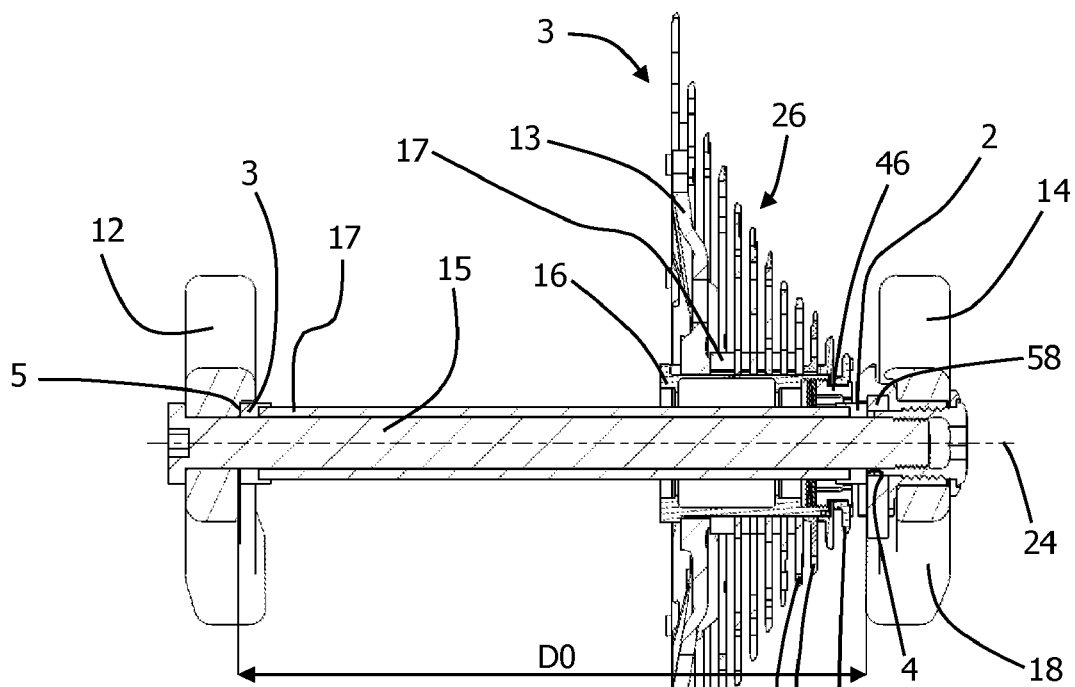
FIGS. 2a-b show a respective sectional view of a rear wheel assembly according to one embodiment, which is fastened to a rear wheel hub attached between two frame portions.
Figure 2B:
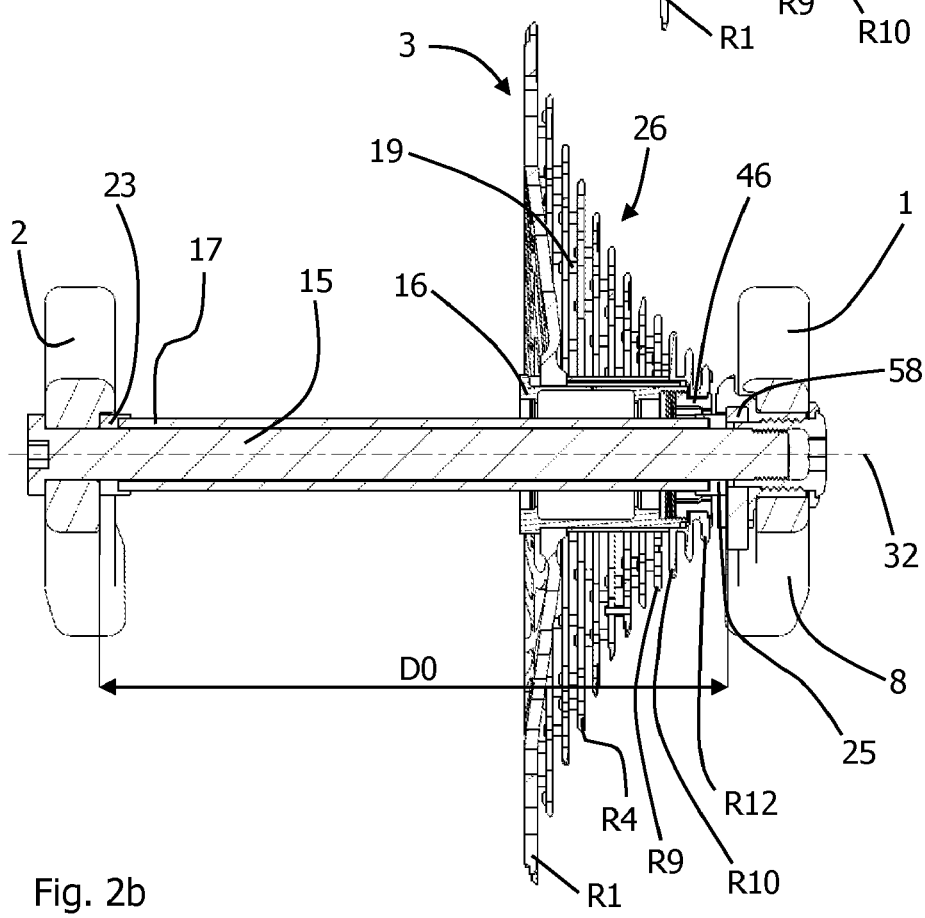

FIGS. 2a-b illustrate the multi-sprocket arrangement 26 with twelve sprockets R1-R12 with reference to two multi-sprocket arrangements 26 that differ in design. FIG. 2a shows a multi-sprocket arrangement 26 in which the four largest sprockets R1-R4 are connected to a spider 13, and therefore the torque is transmitted to the driver 16 via the spider 13. In this space-saving embodiment, the four largest sprockets are spaced apart radially from the driver 16. The six middle sprockets R4-R9 are in each case spaced apart axially from one another with spacers 27 and engage directly in a torque-transmitting manner in the driver 16. The two smallest sprockets R11, R12 are connected with a locking screw 46 to the driver 16 in a torque-transmitting manner via the third smallest sprocket R10.

FIG. 2b shows an alternative multi-sprocket arrangement 26 in which the sprockets are connected to one another by pins 19. Only the largest sprocket R1 is connected to the driver 16 in a torque-transmitting manner, i.e. reaches radially as far as the driver 16. The remaining sprockets R2-R12 are spaced apart radially from the driver 16. The three smallest sprockets are formed integrally, for example are welded to one another, and are connected to the driver 16 in a torque-transmitting manner via the third smallest sprocket R10, and are fixed axially via the locking screw 46.

FIGS. 2a-b furthermore show the installation width D0 which is available for the components to be fastened to the rear wheel hub 17 and is at least 142 mm. The installation width is the distance from an outer side 7, adjacent to the frame portion 12, of a left hub end cap 3 to an outer side 4, adjacent to the frame portion 14, of the right hub end cap 2.

Figure 6:
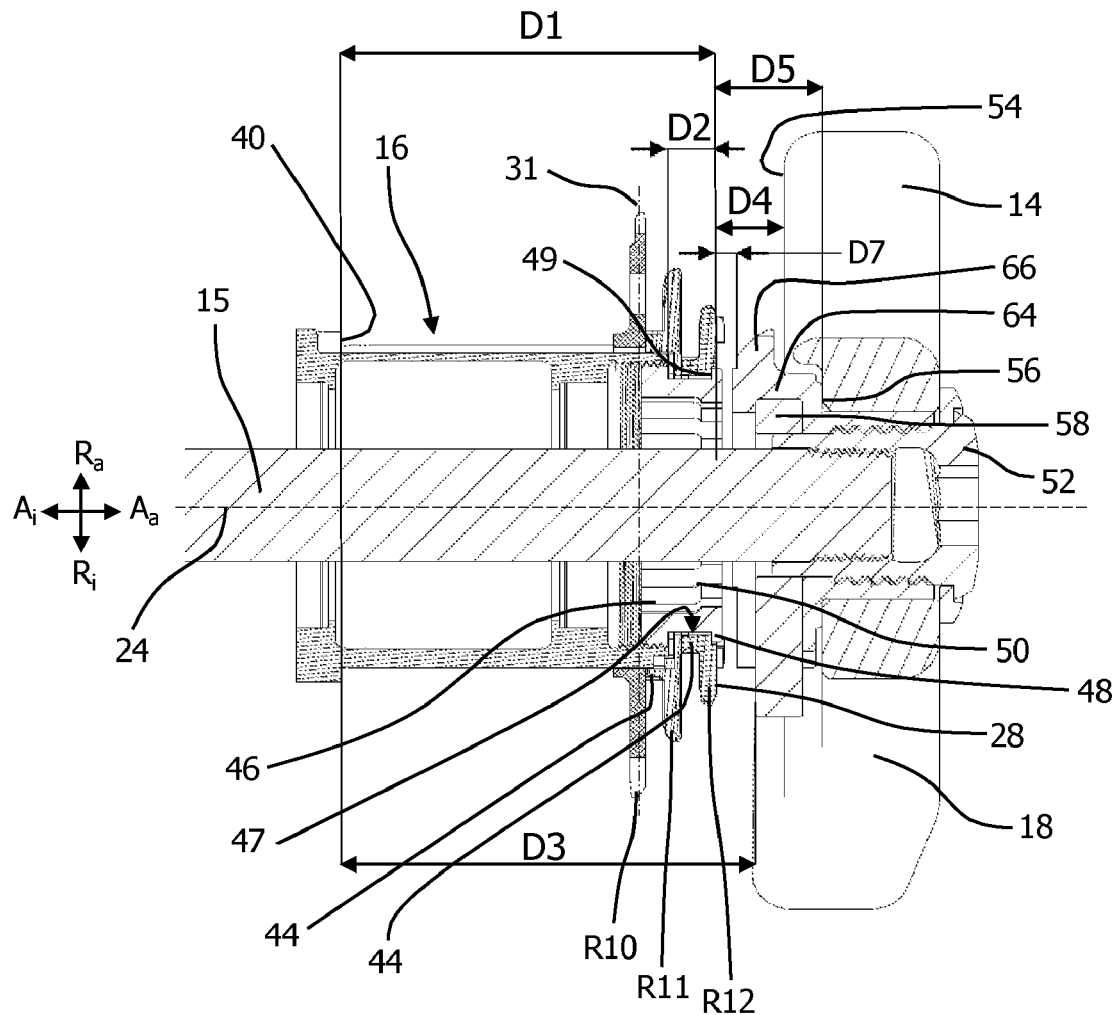
FIG. 6 shows a sectional view of the rear wheel assembly according to FIG. 3.

FIGS. 2a, 3 and 6 illustrate a rear wheel assembly 10 with a multi-sprocket arrangement according to the first embodiment. The rear wheel assembly 10 comprises a driver which is referred to below as the first type of driver 16 and is also referred to in expert circles as a "standard driver" because of its prevalence. The first type of driver 16 is illustrated in FIGS. 5*a-c* as a separate component with selected characteristic dimensions being indicated. On its radially outer circumferential surface, it has a driver profile 32 which rises radially outwards from a basic surface 34. The driver profile 32 can comprise driver protrusions or what are referred to as splines. At least one of the splines 32' differs in its dimensions from the other splines of the profile 32. As a rule, sprockets to be fastened to the driver 16 have an inner contour formed in a complementary manner to the driver profile 32 of the driver 16. Sprockets with a corresponding inner contour and the driver 16 can thereby enter into engagement in a torque-transmitting manner.

For example, the driver 16 can have the driver profile on a first region of its radial outer surface, which region extends along a first axial length L1 axially outwards $A_a$ from a driver stop 40. For all of the exemplary embodiments in general, a driver stop generally refers to a portion of the driver 16, 116, 1016, against which the multi-sprocket arrangement 26, 126, 1026 which is fastened thereto strikes and by means of which the position of the multi-sprocket arrangement 26, 126, 1026 can be determined in relation to the driver 16, 116, 1016. This first axial length L1 of the first type of driver is preferably greater than 32.9 mm, preferably 33.2+/−0.2 mm. An outer diameter d1 in this first region, as measured at radial outer surfaces of the driver profile 32, 32', is preferably greater than 34.2 mm, preferably 34.5+/−0.15 mm.

As is apparent in FIGS. 5*a-c*, the first region with the driver profile 32 is adjoined by a relatively short second region in which the radial outer surface of the driver 16 is free from the driver profile and is therefore smooth. A second axial length L2 of the driver 16 extends from the driver stop 40 as far as an axially outer end side 42 of the driver 16 and is between 34.5 mm and 35.9 mm, but preferably 34.9+/−0.3 mm. An outer diameter d2 of the second region can be larger than 31.4 mm and is preferably 32.1+/−0.2 mm.

Furthermore, the driver 16 has a radially inwardly pointing internal thread 38 adjacent to its axially outer end side 42. The internal thread 38 preferably has a nominal diameter d3 of less than 29.8 mm and preferably of approximately 30.6 mm. A preferred pitch of the internal thread of the driver is 24 TPI, and therefore the thread can also be characterized according to known dimensioning as M 30.6× 24 TPI.

As is apparent in FIG. 6, in the case of the rear wheel assembly 10, a plurality of sprockets of the multi-sprocket arrangement 26 can be attached not only in the region of the outer circumference of the first type of driver 16, but also axially outside the first driver 16, i.e. axially in front of the driver 16. This results, according to FIG. 6, in a first distance D1 in the axial direction from the driver stop 40 to the outer side surface 28 of the smallest sprocket R12, which distance is greater than 38.0 mm. It goes without saying that the available installation width can best be used for the arrangement of as large a number of sprockets as possible if the first distance D1 is as large as possible, for example is greater than 39.1 mm or even better 39.9+/−0.2 mm.

In the embodiment illustrated in FIG. 6, two sprockets R12, R11 with the smallest numbers of teeth are arranged axially in front of the first type of driver 16. These two sprockets have an inner diameter which is smaller than an outer diameter of the driver 16. Furthermore, the inner diameter of the smaller sprockets R12, R11 is also smaller than the nominal diameter d3 of the internal thread of the driver 16. With the two sprockets R12, R11 arranged outer the driver 16, a second distance D2 is produced in the axial direction from the axially outer end side 42 of the first type of driver 16 to an outer side surface 28 of the sprocket R12 with the smallest number of teeth. This second distance D2 is greater than 4.0 mm and is preferably 5.0+/−0.2 mm.

The two sprockets R12, R11 arranged in front of or axially outside the first type of driver 16 are formed in a radially self-supporting manner, but are connected to a further sprocket R10 of the multi-sprocket arrangement 26. That is to say, the sprockets R12, R11 which are formed in a self-supporting manner are themselves not supported on their radially inner circumference, but rather are connected to a sprocket R10 which is supported radially on the first type of driver and engages in the driver profile 32 on the outer circumference of the first type of driver 16. In order to connect the self-supporting two smallest sprockets R12, R11 to each other and to connect same to the adjacent sprocket R10 fastened to the driver 16, connectors 44 are provided which extend between the sprockets and parallel to the rear wheel hub or parallel to the axis of rotation 24 of the multi-sprocket arrangement 26. The connectors 44 are attached in the region of a root circle of the sprockets, as is apparent in FIG. 6. The connectors 44 can be a flange or another annular fastening element. Retaining pins which are connected to two adjacent sprockets can also alternatively be used as the connectors 44.

The two sprockets R12, R11 arranged in a radially self-supporting manner are axially fixed by means of a locking element. FIG. 6 illustrates the locking element as a locking screw 46 which, in the mounted state, engages by means of an external thread arranged on its outer circumference in the internal thread of the first type of driver 16. Furthermore, the locking element 46 illustrated in FIG. 6 comprises a projection 48 on its axially outwardly pointing end side. The projection 48 is designed to lie against an end surface of the smallest sprocket R12 and to absorb a force in the axial direction that is exerted on the sprockets R12, R11. Put more precisely, a force acting axially outwards $R_a$ is absorbed by the projection 48 of the locking element 46. The locking element 46 thus fixes the two self-supporting sprockets R12, R11 axially. For a space-saving arrangement, the projection 48 engages in a cut-out 49 in the smallest sprocket R12 in such a manner that the projection 48 ends flush with the outer side surface 28 of the smallest sprocket R12 or protrudes from the outer side surface by a maximum of 2 mm, preferably a maximum of 0.9 mm.

For simple screwing of the locking element 46 into the driver 16, the locking screw has a tool interface 50 in the region of its inner circumference. The locking element 46 is designed to receive one or both of the two smallest sprockets. For this purpose, the locking element 46 has a region 47 for receiving a sprocket, the region being designed as an undercut and having a reduced outer diameter. The outer diameter of the undercut is smaller than an outer diameter of the first type of driver 16. The sprocket or the sprockets received in the region of the undercut can thus have an inner diameter which makes it possible, for example, to receive sprockets with ten teeth and a correspondingly small root circle. An undercut is understood here as meaning that there is a region, the outer circumferential surface of which is bounded by two axial stops with a larger diameter.

The two self-supporting sprockets R12, R11 are connected to each other via the connectors 44'. This can be a releasable connection or a joining connection which, for example, can be released again only by being destroyed. When the locking element 46 is installed, the two self-supporting sprockets R12, R11 can be rotatable about a center axis of the connectors 44'. That is to say, the locking element 46 can be screwed into the first type of driver 16 irrespective of a rotational orientation of the sprockets R12, R11. This makes it possible to fasten the self-supporting sprockets R12, R11 in relation to the sprocket R10 received on the first type of driver 16 only when the desired rotational orientation is determined.

It goes without saying that one option for receiving the self-supporting sprockets R12, R11 is to provide the locking element 46 with an undercut, particularly if the inner diameter of the sprockets R12, R11 to be received corresponds to, or is slightly larger than, the outer diameter of the region 47 with the undercut. For this purpose, for example, the locking element 46 can be designed in two parts and can be connected only after the self-supporting sprockets R12, R11 are arranged in the region 47 with the undercut, for example by means of a joining connection or a screw connection. Alternatively, the locking element 46 can have an elastic region, and therefore the self-supporting sprockets R12, R11 despite the undercut of the locking element 46 can be pushed by means of the elastic region via the elastic region to the region 47 with the undercut. Alternatively, an additive manufacturing method, for example a 3D printing method, is possible.

The above-described rear wheel assembly 10 thus permits a torque exerted on the self-supporting sprockets R12, R11 to be transmitted to the first type of driver 16. If, for example, a torque is exerted on the smallest sprocket R12 by the bicycle chain, torque is transmitted from the smallest sprocket R12 to the second smallest sprocket R11 via the connectors 44' between the smallest sprocket R12 and the second smallest sprocket R11. Since the second smallest sprocket R11 also does not have any direct connection to the first type of driver 16, the torque is transmitted further to the first type of driver 16 via the connectors 44 between the second smallest sprocket R11 and the sprocket R10 which is adjacent thereto and is connected to the first type of driver 16. It goes without saying that a torque exerted on the second smallest sprocket R11 is likewise transmitted via the connectors 44 to the sprocket R10 connected to the first type of driver 16 and consequently to the first type of driver 16.

FIG. 6 shows, in a partial sectional view, the rear wheel assembly 10 mounted on the bicycle hub which is held in the dropout 18 of the frame portion 14 by a holding screw 52. For optimum use of the construction space, i.e. the installation width available for the rear wheel assembly 10, a fourth distance D4 in the axial direction from the outer side surface 28 of the smallest sprocket R12 to a circumferential surface 54 of the frame portion 14 or of the rear dropout 18 of the bicycle frame is made as short as possible. For example, said fourth distance D4 is smaller than 8.2 mm and preferably 7.2+/−0.2 mm. In some cases, the frame portion 14 or the dropout 18 thereof has a recessed surface 56 which serves for receiving a derailleur hanger 58. In order to have sufficient construction space available for installing the derailleur hanger 58 between the frame portion 14 or the dropout 18 thereof and the rear wheel assembly 10, a fifth distance D5 in the axial direction from the outer side surface 28 of the smallest sprocket R12 to the recessed surface 56 on the frame portion 14 or the dropout 18 thereof is smaller than 12.2 mm and preferably approximately 11.2+/−0.2 mm.

As previously mentioned, the derailleur hanger 58 is arranged in the discussed region axially between the smallest sprocket R12 and the frame portion 14. The derailleur hanger 58 is configured to carry a rear gearshift mechanism. For this purpose, it is fastened to the rear wheel axle 15 and, in a first region 60, has a through hole 62 which can best be seen in FIGS. 4*a*-*b* and serves for fastening the rear gearshift mechanism. The derailleur hanger 58 illustrated in FIG. 6 furthermore has a second region 64 which is arranged opposite the first region 60. The second region 64 is connected to the rear wheel hub and, in the illustration of FIG. 6, has a protrusion 66 which is adjacent to the smallest sprocket R12. Furthermore, the derailleur hanger 58 has a wheel installation groove 59 which is shown in FIG. 4*b*. The wheel installation groove 59 is defined by an offset between the first region 60 and the second region 64 of the derailleur hanger 58. The wheel installation groove 59 has a width 61 of between 2 mm and 3 mm, preferably of 2.5+/−0.2 mm. The first region 60 can be produced from a thermoplastic and the second region 64 from a metallic material. The above design of the wheel installation groove 59 with its indicated width 61 provides an option for forming the multi-sprocket arrangement in which the smallest sprocket can be positioned in a direction lying as far as possible axially on the outside. Consequently, a chain skew can be reduced and the installation width can be used particularly effectively.

The discussed wheel installation groove 59 can thus contribute to a seventh distance D7 between the outer side surface 28 of the smallest sprocket R12 and a surface of the protrusion 66 of the second region 64 of the derailleur hanger 58, said surface facing said sprocket, being at least 2.2 mm. A sufficient clearance between the protrusion 66 of the derailleur hanger 58 and a chain which is in engagement with the smallest sprocket R12 can thereby be provided. The seventh distance D7 should, however, be smaller than 3.2 mm with regard to making the best possible use of the available construction space.

A rear wheel assembly 100 with a multi-sprocket arrangement according to a second embodiment will be described below. Elements which have already been described with regard to the first embodiment and are correspondingly contained in the second embodiment are provided with reference signs increased by the value 100 and will be described below only in so far as their configuration or function differs from the preceding descriptions.

According to the second embodiment, the rear wheel assembly 100 comprises a second type of driver 116 on which, in the mounted state, at least two sprockets with the smallest numbers of teeth R12, R11 are formed in a radially self-supporting manner and are connected to the second type of driver via at least one further sprocket R10 with a greater number of teeth. As can best be seen in the enlarged detail of FIG. 7*b*, the three sprockets R12, R11, R10 with the smallest numbers of teeth are arranged in such a manner that a sprocket center plane 131 of the sprocket R10 with the third smallest number of teeth runs in the region of the axial end surface 142 of the second type of driver or axially outside the second type of driver. To clarify the axial offset of the sprocket center plane 131 and the axial end surface 142 of the second type of driver 116, the line 200 represents an extension of the axial end surface 142 of the second type of driver 116.

The rear wheel assembly 100 likewise has a locking element 146 which is similar to the locking element 46 according to the first embodiment. As is apparent in FIG. 7*b*, the locking element is provided in the form of a locking screw 146 with an external thread for engagement in an internal thread of the second type of driver and with a projection 148. Even though, in FIG. 7*b*, the projection 148 is illustrated axially outside the smallest sprocket R12, the smallest sprocket R12, in an alternative embodiment, at the transition between its axially outer end side and its inner circumferential surface can have a cut-out in which the projection 148 of the locking screw 146 can engage.

Figure 7A:
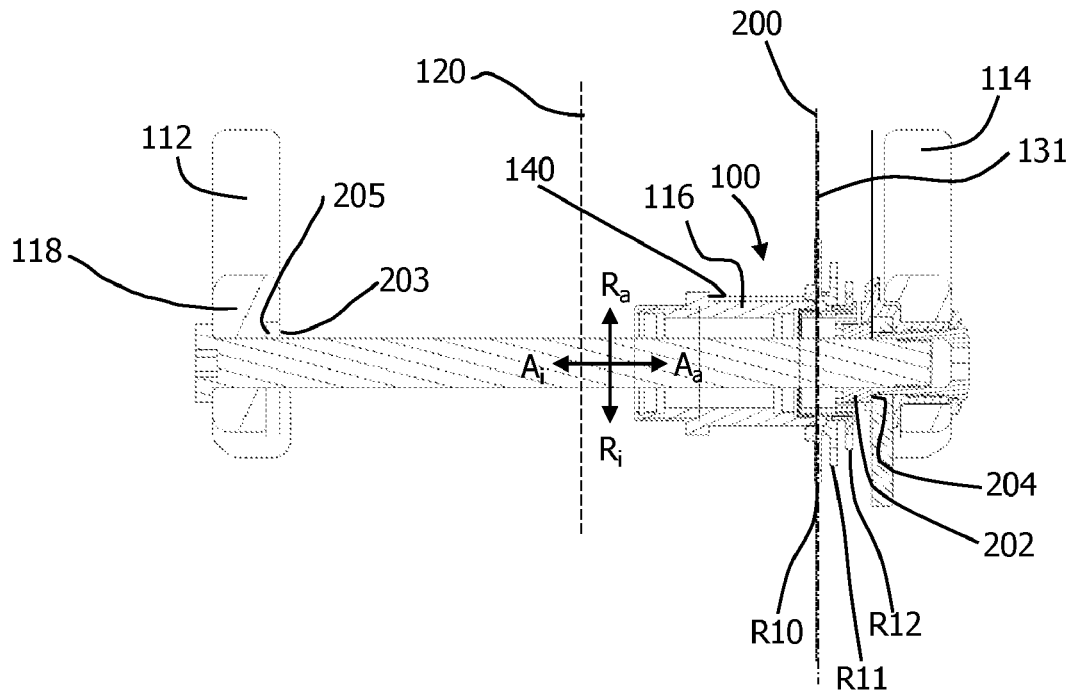
FIGS. 7a-b show a sectional view through a rear wheel assembly which comprises a multi-sprocket arrangement according to a second embodiment and a second type of driver.
Figure 7B:
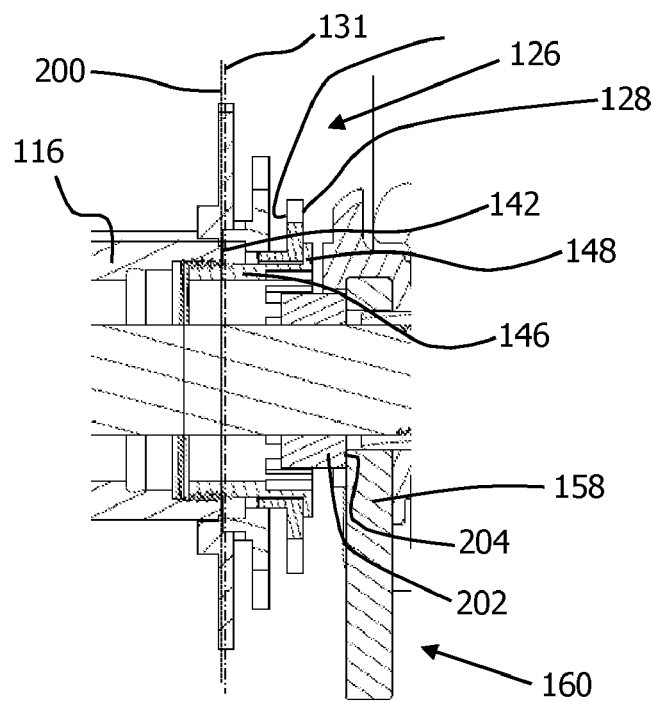

In the embodiment illustrated in FIGS. 7a-b, an inner diameter of the sprocket R12 with the smallest number of teeth is identical to an internal thread diameter (nominal diameter) of the internal thread of the second type of driver 116, which internal thread is designed for receiving the locking element 146.

The second type of driver is distinguished by its geometrical dimensions which will be explained in more detail below with reference to FIGS. 8a-b.

The second type of driver 116 also has a driver profile 132, 132' on a first region of its radial outer circumferential surface, which region extends along a first axial length L1 from a driver stop 140 axially outwards $A_a$. This first axial length L1 is greater than 24.7 mm and is preferably 25.7+/−0.2 mm. An outer diameter d1 in this first region, as measured at radial outer surfaces of the driver profile 32, 32', is preferably greater than 31.6 mm and is preferably 32.6+0.05/−0.1 mm.

Figure 8A:
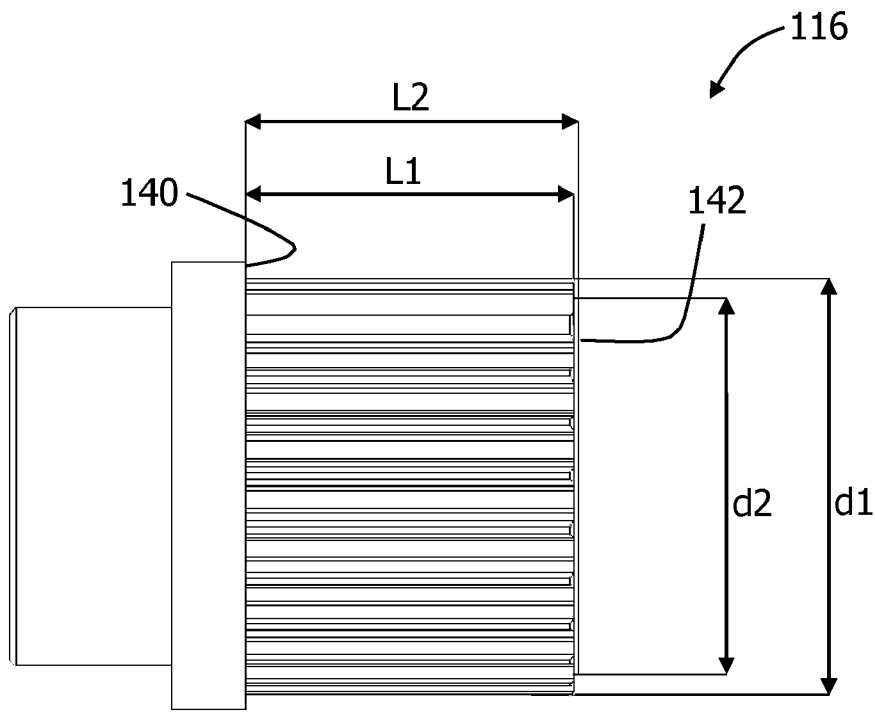
FIGS. 8a-b show the second type of driver of the rear wheel assembly in a side view (FIG. 8a) and in a front view (FIG. 8b) for the rear wheel assembly.
Figure 8B:
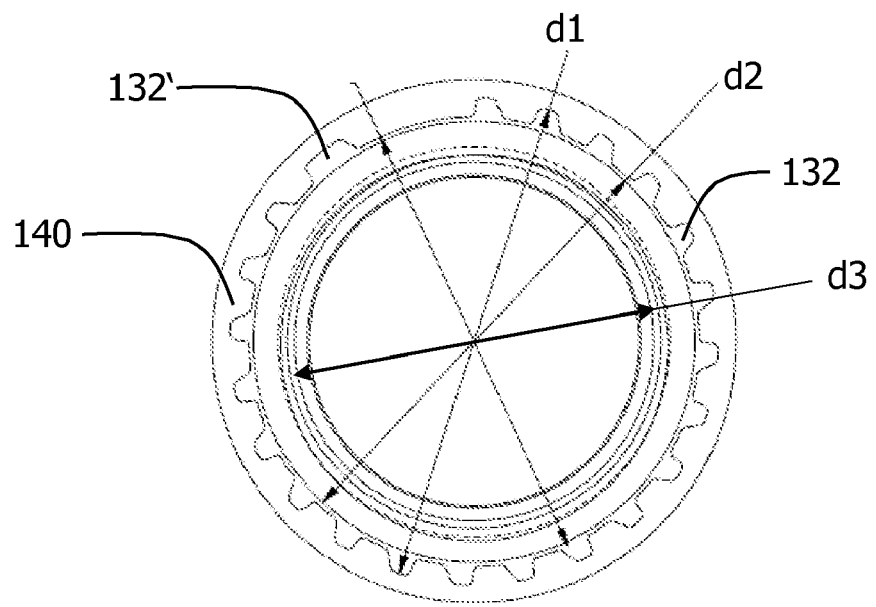

As is apparent in FIG. 8a, the first region with the driver profile 32, 32' is adjoined by a second region in which the radial outer surface of the second type of driver is free from the driver profile. A second axial length L2 of the second type of driver 116 extends from the driver stop 140 as far as an axially outer end side 142 of the second type of driver 116 and is between 25 mm and 27 mm, but preferably 26.0+/−0.2 mm. An outer diameter d2 of the second region can be larger than 31.4 mm and is preferably 29.5+/−0.1 mm.

The multi-sprocket arrangement 126 also uses the construction space available thereto, i.e. the installation width illustrated in FIGS. 2a-b, in an advantageous manner in comparison to the prior art. For this purpose, as already described, sprockets R12, R11, R10 are arranged axially in front of the second type of driver. A first distance D1 is produced in the axial direction from the driver stop 140 as far as the outer side surface 128 of the smallest sprocket R12 of greater than 34 mm and preferably of 35.0+/−0.2 mm.

According to the second embodiment, a second distance D2 in the axial direction from the axially outer end side 42 of the second type of driver to an outer side surface 128 of the sprocket R12 with the smallest number of teeth is greater than 4.0 mm and preferably 5.0+/−0.2 mm.

Figure 9:
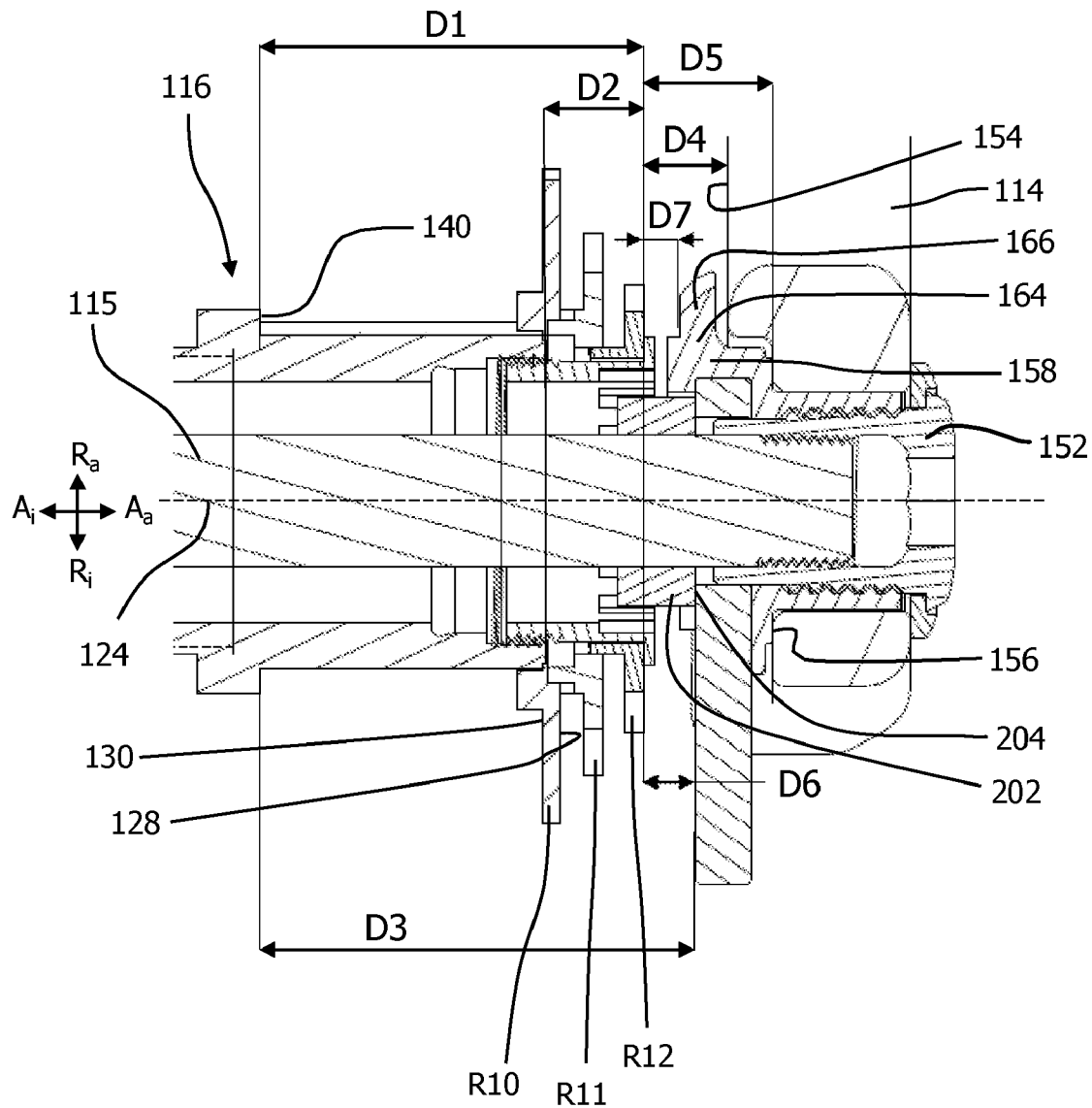
FIG. 9 shows an enlarged view of the rear wheel assembly illustrated in FIG. 7a and attached to a frame dropout.

FIG. 9 shows the rear wheel assembly 100 mounted on the bicycle hub which is held in the dropout 118 of the frame portion 114 by a holding screw 152. In order to set the axial hub play, a hub end cap 202 is provided which is arranged on the outer circumferential surface of the bicycle hub and encloses the latter in a radially encircling manner. A third distance D3 between the driver stop 140 and an axially outwardly facing end side 204 of the hub end cap 202 in the mounted state can be greater than 38.1 mm and can preferably be 39.7+/−0.2 mm.

The rear wheel assembly comprises a further hub end cap 203 which is arranged on the rear wheel hub adjacent to the frame portion 112 which is further away from the driver, as is apparent in FIGS. 2a-b. A hub end cap distance D0 between axially outer end sides 204, 205 of the hub end caps can be at least 142 mm, is preferably at least 148 mm and is even more preferably at least 157 mm. In general for all of the exemplary embodiments, the discussed distance D0 between the axially outer end sides of the hub end caps is referred to as the installation width.

For optimum use of the construction space, i.e. the installation width available for the rear wheel assembly, a fourth distance D4 in the axial direction from the outer side surface 128 of the smallest sprocket R12 to a circumferential surface 154 of the frame portion 114 or of the rear dropout 118 of the bicycle frame is designed to be as small as possible. For example, this fourth distance D4 is smaller than 8.7 mm and preferably 7.7+/−0.2 mm. Furthermore, a fifth distance D5 in the axial direction from the outer side surface 128 of the smallest sprocket R12 to the recessed surface 156 on the frame portion 114 or the dropout 118 thereof can be smaller than 12.7 mm and preferably 11.7+/−0.2 mm. In addition, a sixth distance D6 between the outer side surface 128 of the sprocket R12 with the smallest number of teeth and a radially outwardly facing end side 204 of the hub end cap can be 4.7+/−0.2 mm.

A derailleur hanger 158 corresponding to the derailleur hanger 58 according to the first embodiment is arranged between the frame portion 114 and the second type of driver 116. As described with regard to the first embodiment, the derailleur hanger 158 has a first region 160 with a through hole for the installation of the rear gearshift mechanism and a second region 164 with a protrusion 166 adjacent to the smallest sprocket R12. Furthermore, the derailleur hanger 158 has the wheel installation groove 59 discussed with regard to the first embodiment with a width 61 of between 2.0 mm and 3.0 mm, preferably of 2.5+/−0.2 mm. A seventh distance D7 between the outer side surface 128 of the smallest sprocket R12 and a surface of the protrusion 166 of the second region 164 of the derailleur hanger 158, said surface facing said sprocket, can be at least 2.7 mm. It is thereby ensured that there is sufficient clearance between the protrusion 166 of the derailleur hanger 158 and a chain which is in engagement with the smallest sprocket R12. The seventh distance D7 should, however, be smaller than 3.2 mm in respect of the best possible use of the available construction space.

A rear wheel assembly 1000 according to a third embodiment will be described below. Elements which have already been described with regard to the first or second embodiment and are correspondingly contained in the third embodiment are provided with reference signs increased by the value 1000 and will be described below only in so far as their configuration or function differs from the previous descriptions.

Figure 10:
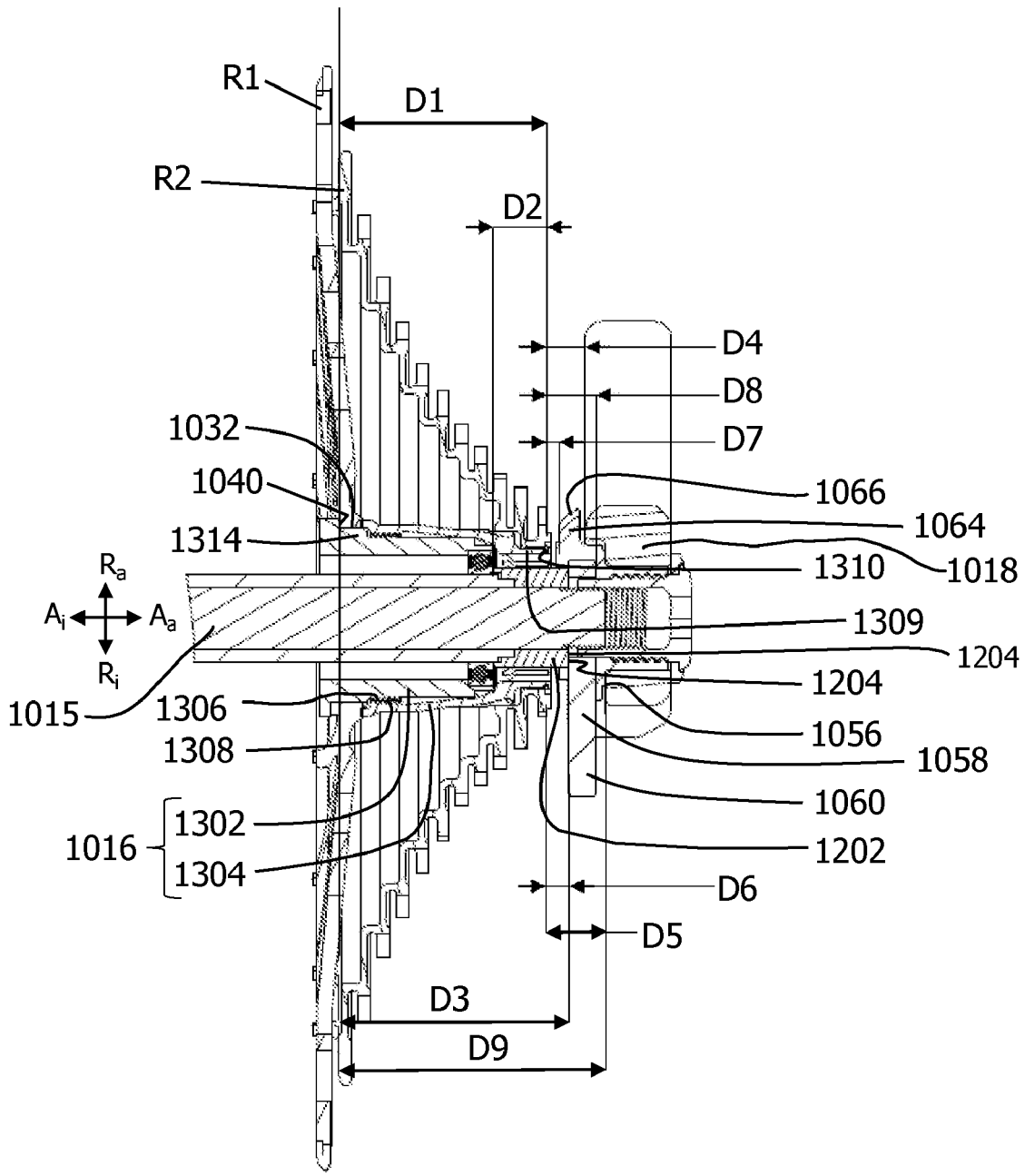
FIG. 10 shows a sectional view through a rear wheel assembly which comprises a multi-sprocket arrangement according to a third embodiment and a third type of driver.

The multi-sprocket arrangement 1026 according to the third embodiment and illustrated in FIGS. 10-12 is coupled or can be coupled to a third type of driver 1016, wherein, in the coupled state, at least two sprockets with the smallest numbers of teeth R12, R11 are formed in a radially self-supporting manner and are coupled to the third type of driver via at least one further sprocket R10 with a greater number of teeth. As can best be seen in the enlarged detail of FIG. 11b, the three sprockets R12, R11, R10 with the smallest numbers of teeth are arranged in such a manner that the sprocket center plane 1031 of the sprocket with the third smallest number of teeth R10 runs axially outside the axially outer end surface 1042 of the third type of driver. In addition, in the case of the third type of driver, even the sprocket inner surface/sprocket inner plane 1030 of the third smallest sprocket R10 is arranged axially outside the axially outer end surface 1042 of the third type of driver 1016, as the distance, indicated by reference sign 1300, between the sprocket inner surface/sprocket inner plane 1030 and the axially outer end surface 1042 of the third type of driver 1016 clarifies.

The third type of driver 1016 differs from the first and second driver 16, 116 in that it comprises a driver body 1302 and a receiving body 1304. The driver body 1302 has a driver stop 1040 and a region which is adjacent thereto and which has an external thread 1306 on its outer circumferential surface. By contrast, the receiving body 1304 has an internal thread 1308 on its inner circumferential surface, said internal thread being designed to engage in the external thread 1306 of the driver body 1302 in the assembled state of the third type of driver 1016.

In the mounted state of the multi-sprocket arrangement with the third type of driver, the receiving body 1304 strikes with its axially inner end against a largest sprocket R1 of the multi-sprocket arrangement 1026, and therefore the largest sprocket R1 strikes both against the driver stop 1040 of the driver body 1302 and against the receiving body 1304. At the opposite, axially outer end of the receiving body 1304, the receiving body 1304 extends with an axially outer end portion 1309 axially outwards $A_a$ beyond the driver body 1302. As explained more precisely later on, the receiving body 1304 can thus also axially fix sprockets which are arranged outside the driver body 1302. For this purpose, the receiving body 1304 comprises, adjacent to its axially outer end, a securing element 1310 which axially fixes the multi-sprocket arrangement 1026 and consequently prevents axial displacement of the sprockets. Furthermore, as illustrated in FIG. 10 or in FIG. 11, the receiving body 1304 engages by means of the securing element 1310 in a cut-out 1049 of the smallest sprocket R12. The securing element 1310 can be a securing ring 1310 which is received in a groove 1312 in the vicinity of the axially outer end of the receiving body 1304. The securing element 1310 can therefore be connected releasably to the receiving body 1304.

Even if the receiving body 1304 is not referred to as a locking element, it can nevertheless take on the function of such a locking element, such as the axial fixing of the sprockets.

If the securing element 1310 is in engagement with the cut-out 1049 of the smallest sprocket R12, an axially outer end side 1315 of the smallest sprocket R12 ends flush with an axially outer end side 1316 of the receiving body 1304, as is apparent, for example, in FIG. 11b. In an alternative embodiment, the axial end side 1316 of the receiving body 1304 can protrude slightly from the outer side surface 1028 of the smallest sprocket R12, but by a maximum of 0.9 mm. It goes without saying that the securing element 1310 can therefore be arranged in the region of the cut-out 1049 of the smallest sprocket R12. The securing element 1310 therefore lies offset axially inwards $A_i$ from the outer side surface 1028 of the smallest sprocket R12.

The inner diameter of the axially outer end portion 1309 of the receiving body 1304 is smaller than an outer diameter of the driver body 1302. Consequently, sprockets R12, R11 which have an inner diameter which is smaller than an outer diameter of the driver body 1302 can be accommodated axially outside the driver body 1302.

FIG. 10 illustrates the distances already introduced for the previous embodiments. A first distance D1 in the axial direction from the driver stop 1040 to the outer side surface 1028 of the sprocket R12 with the smallest number of teeth can be greater than 37.4 mm. Furthermore, the first distance D1 can be greater than 38.0 mm or even preferably 39.9 mm. A second distance D2 in the axial direction from the axially outer end side 1042 of the driver body 1302 to an outer side surface 1028 of the sprocket with the smallest number of teeth R12 can be smaller than 9.1 mm and is preferably 7.1+/−0.12 mm.

Furthermore, the rear wheel assembly 1000 comprises a hub end cap 1202 which strikes both against a bearing of the driver 1016 and against a derailleur hanger 1058. A third distance D3 between the driver stop 1040 and the radially outer end side 1204 of the hub end cap 1202 can be greater than 42.5 mm in the assembly state of the rear wheel assembly 1000 with the bicycle frame. Even more preferably, the third distance D3 is approximately 44.1+1.0/−0.3 mm. The fourth distance D4 between the outer side surface 1028 of the smallest sprocket R12 to a circumferential surface of the frame portion 1014 or the dropout 1018 thereof can be greater than 8.35 mm. For effective use of the construction space or of the construction space available to the rear wheel assembly 1000, the fourth distance D4 can preferably be 7.35+/−0.15 mm. The fifth distance D5 in the axial direction from the outer side surface 1028 of the sprocket with the smallest number of teeth R12 to a recessed surface 1056 at the rear dropout 1018 of the bicycle frame can be smaller than 11.5 mm. For particularly effective use of the construction space, the fifth distance D5 can, however, preferably be 10.5+/−0.15 mm. In addition, a sixth distance D6 between the outer side surface 1028 of the sprocket R12 with the smallest number of teeth and a radially outwardly facing end side 1204 of the hub end cap can be 4.7+/−0.2 mm.

The derailleur hanger 1058 corresponds to the derailleur hanger 58 realized with regard to the first embodiment. The seventh distance D7 between the outer side surface 1028 of the smallest sprocket R12 and an axially inner surface of the protrusion 1066 of the derailleur hanger 1058 is, for example, 2.35 mm. Furthermore, in order to characterize the position of the rear wheel assembly according to the third embodiment, an eighth distance D8 between the outer side surface 1028 of the smallest sprocket R12 to an axially outer side surface of a metal part 1311 of the derailleur hanger 1058 can be used. This eighth distance D8 is, for example, 9.35 mm. The starting point here is therefore that use is made of a derailleur hanger 1058 which has a metal part 1311, for example the derailleur hanger illustrated in FIG. 4b. Said metal part 1311 is encapsulated with plastic by injection moulding in the second region 1064 of the derailleur hanger 1058. For example, the second region 1064 with its protrusion 1066 is formed from plastic. The first region 1060 for receiving a rear gearshift mechanism and the region for installation on the rear wheel hub 1017 can be metal, for example.

Furthermore, a ninth distance D9 from the driver stop 1040 to a recessed surface 1056 on the rear dropout 1018 is, for example, 51.1 mm.

A torque exerted on one of the sprockets R2-R12 of the multi-sprocket arrangement 1026 is transmitted via interconnected sprockets 1026 to the largest sprocket R1. For example, for this purpose, all of the sprockets of the multi-sprocket arrangement 1026 are connected to one another in a torque-transmitting manner. In addition, for example, all of the sprockets, apart from the largest sprocket R1, are integrally connected to one another. A multi-sprocket arrangement 1026 produced by 3D printing is in principle possible. Alternatively, the connection can be formed by means of connecting elements, such as flanges or holding pins. Furthermore, the sprockets can also be connected integrally. In order to transmit the torque from the largest sprocket R1 to the third type of driver 1016, the driver body 1302 has, on its outer circumferential surface which is adjacent to an axially inner end surface of the driver body 1302, a driver profile 1032 in which a complementary driver profile on the inner circumferential surface of the largest sprocket R1 engages in a torque-transmitting manner. In addition, the largest sprocket R1 is supported radially on the driver body 1302 in the region 1314 in which the driver profile 1032 is arranged.

Figures 12A, 12B:
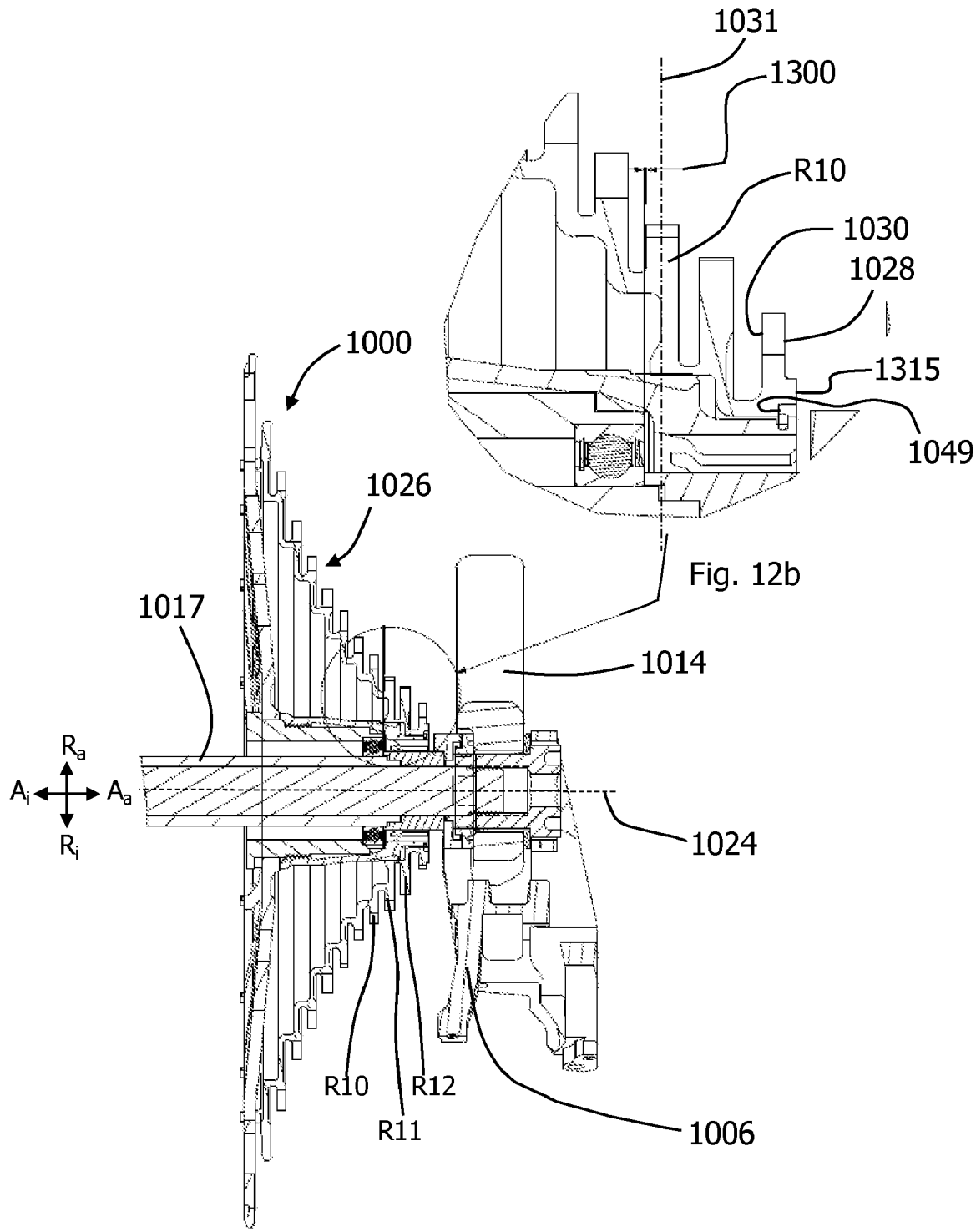
FIGS. 12a-b show a sectional view through a rear wheel assembly which comprises a multi-sprocket arrangement according to the third embodiment and the third type of driver (FIG. 12a), and an enlarged detail of the rear wheel assembly (FIG. 12b)

FIGS. 12a-b show a rear wheel assembly 1000 which is mounted on a bicycle frame and has a multi-sprocket arrangement 1026. In the case of the rear wheel assembly 1000 illustrated in FIGS. 12a-b, the rear gearshift mechanism is mounted on the rear dropout 1018 of the frame portion 1014 coaxially with respect to the axis of rotation 1024 by a structural element 1006 which is also referred to as a b-knuckle 1006. A derailleur hanger for attaching the rear gearshift mechanism is therefore not provided according to the fourth embodiment; on the contrary, the structural element 1006 carrying the rear gearshift mechanism is fastened to the frame portion 1014 by the rear wheel axle 1015, which is in the form of a plug-in axle.

The receiving body 1304 of the third type of driver 1016 will be described more precisely below with reference to FIGS. 13a-d. FIGS. 13a-d show the receiving body 1304 with its axially outer end portion 1309 which, in the assembled state of the third type of driver, protrudes radially outwards $R_a$ in the axial direction over the driver body 1302. In addition, the internal thread 1308 which can engage in the external thread of the driver body 1302 can be seen in the cross-sectional views A-A and B-B of FIGS. 13c and 13d. The receiving body 1302 tapers conically axially outwards in a central region 1318 of the receiving body 1302 between the internal thread 1308 and the axially outer end portion 1309.

Furthermore, the groove 1312 in which the securing element 1310 engages for axially fixing the multi-sprocket arrangement 1026 can be seen in FIGS. 13a and 13c-d. It is also possible for the securing element 1310 to be defined as part of the driver 1302 or as part of the receiving body 1304.

As is apparent in FIG. 13a, the receiving body 1304 has through holes 1320 distributed around its circumference. The through holes 1320 are arranged in the central region 1318 and adjacent to the axially outer end portion 1309 of the receiving body 1304. The through holes are designed to receive a thermoplastic, such as POM, or an elastomer in such a manner that this extends through the through holes 1320 and along the regions adjoining radially on the outside and radially on the inside. FIG. 13c shows a cross section A-A through the receiving body 1304 in a region in which there are no through holes and the thermoplastic or the elastomer 1322 is located both radially outside and radially inside the receiving body 1304. The form of the thermoplastic or of the elastomer 1322 in the region of the through holes 1320 is clarified in the cross-sectional view B-B in FIG. 13d. The region formed from thermoplastic or elastomer can also be referred to as a positioning body 1322. The positioning body 1322 can be injected around the receiving body 1304 in an injection moulding process.

Figures 14A, 14B:
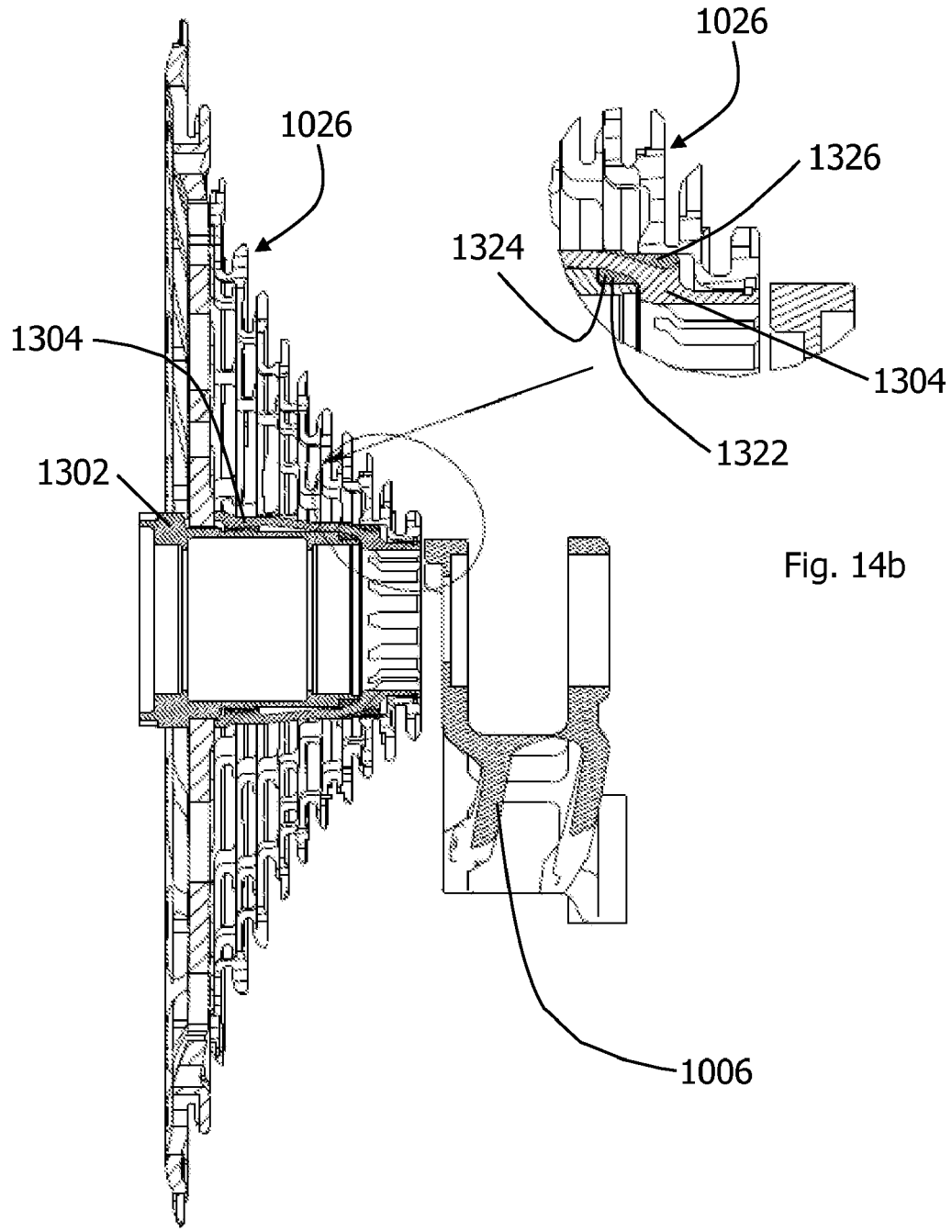
FIGS. 14a-b show a rear wheel assembly in which a multi-sprocket arrangement according to a fourth embodiment is attached to the third type of driver (FIG. 14a), and an enlarged detail of the rear wheel assembly (FIG. 14b)

The positioning body 1322 forms the interfaces 1324, 1326 with respect to the driver body 1302 and the multi-sprocket arrangement 1026. FIG. 14 illustrates a driver body interface 1324, i.e. contact of a radially inner region of the receiving body 1304 on the driver body 1302. Furthermore, FIG. 14 also illustrates a multi-sprocket arrangement interface 1326, i.e. contact of a radially outer region of the receiving body 1304 on the multi-sprocket arrangement 1026. The two interfaces 1324, 1326 are arranged radially offset, with the driver body interface 1324 preferably being arranged axially further on the inside than the multi-sprocket arrangement interface 1326. In an alternative embodiment, not illustrated, the interfaces 1324, 1326 can overlap radially.

The positioning body 1322 permits a radial and axial support of the multi-sprocket arrangement 1026 on the driver body 1302. In the illustration of FIG. 14, the third smallest sprocket R10 is supported radially on the receiving body 1304 while the two smallest sprockets R12 and R11 are formed in a self-supporting manner.

The receiving body 1304 has a tool interface 1323 on an inner circumferential surface of the axially outer end portion 1309. A tool can engage in the tool interface, and the receiving body can be rotated in such a manner that its internal thread 1308 engages in the external thread 1306 of the drive body 1302 such that the two are connected fixedly to each other.

Figure 15A:
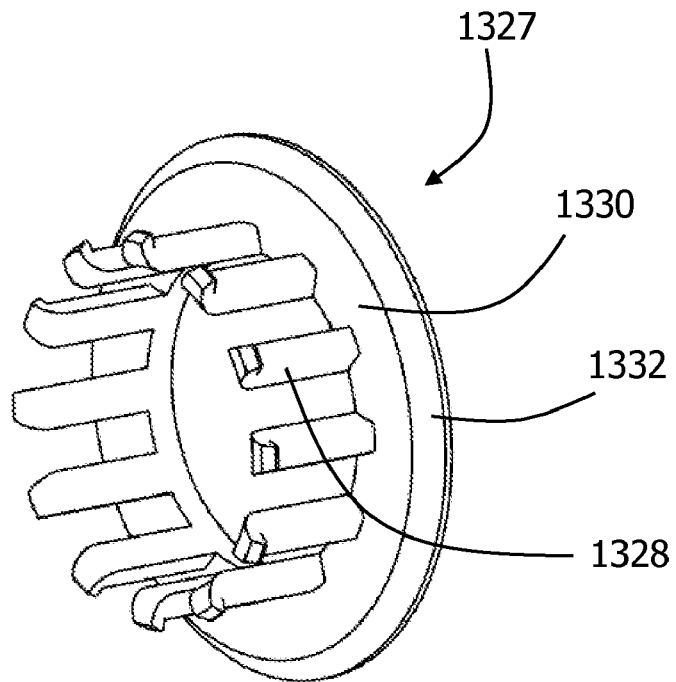
FIGS. 15a-b show a chain drop guard in a perspective view (FIG. 15a) and in cross section with sprockets arranged thereon (FIG. 15b).
Figure 15B:
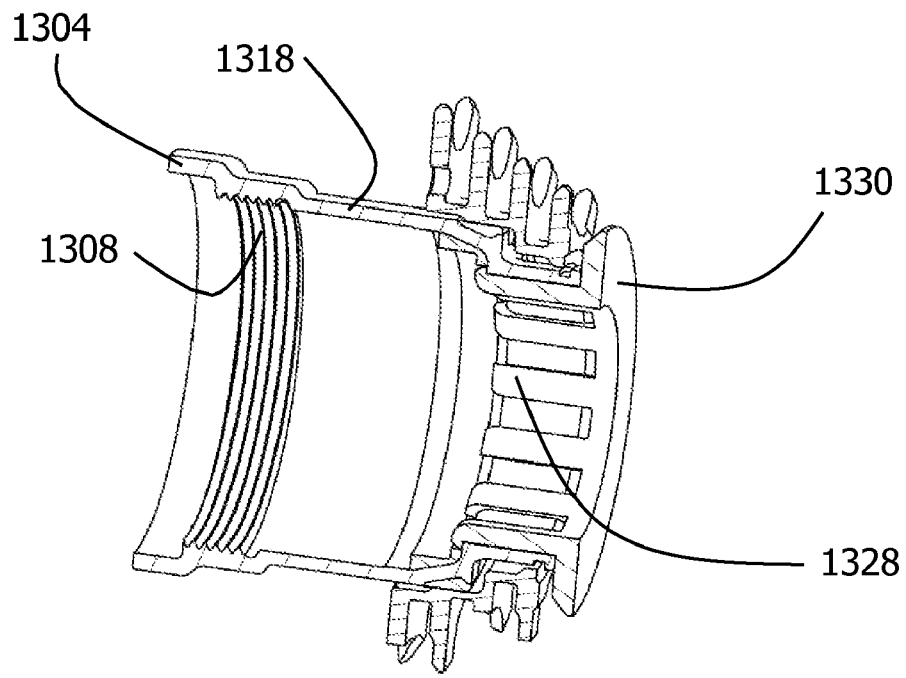

FIGS. 15a-b show a chain throw-off guard 1327 which, in the illustration, is fastened to the receiving body 1304. Alternatively, the chain drop guard 1326 can also be fastened to the multi-sprocket arrangement 1026, but this is not illustrated. The chain drop guard 1327 comprises holding elements 1328 for engaging in the receiving body 1304 or the multi-sprocket arrangement 1026 and a projection 1330 radially outwards. A radially outer surface 1332 of the projection of the chain drop guard 1327 is designed as an oblique surface which, in the mounted state, drops in the direction of the sprocket R12 with the smallest number of teeth, as is apparent in FIG. 15a. In the mounted state, the projection 1330 has an outer diameter which is smaller than an outer diameter of the sprocket with the smallest number of teeth.

For the fastening of the chain drop guard 1327, the holding elements 1328 are formed elastically and designed to engage in the receiving body 1304 or the multi-sprocket arrangement 1026. The engagement in the receiving body takes place in the region of the axially outer end portion 1309 of the receiving body 1304. For example, the holding elements of the chain drop guard can engage in the tool interface 1323 of the receiving body 1304.

Although the above exemplary embodiments relate to a multi-sprocket arrangement with twelve sprockets, the embodiments can equally be applied to a multi-sprocket arrangement with other numbers of sprockets, such as eleven or thirteen sprockets. In the case of eleven sprockets, the two smallest sprockets are to be referred to, within the scope of the notation of the disclosure, by R11 and R10 and the third smallest sprocket by R9. The largest sprocket can be referred to as R1 irrespective of the total number of sprockets. Equally, in the case of thirteen sprockets, the two smallest sprockets can be referred to, within the scope of the notation of the disclosure, by R13 and R12 and the third smallest sprocket by R11. Irrespective of the number of sprockets, the smallest sprocket can have ten or fewer teeth.

Where a smallest or largest sprocket is discussed in this application, this statement refers to a sprocket with the smallest number of teeth or to a sprocket with the largest number of teeth. It goes without saying that a second smallest or third smallest sprocket refers to a sprocket with the second smallest number of teeth or third smallest number of teeth.

The arrangement of at least two self-supporting sprockets makes it possible to use sprockets with a root circle which is smaller than an outer diameter of the driver. As a result, the multi-sprocket arrangement can comprise, for example, sprockets with fewer than ten teeth.

In addition, sprockets which are arranged on the outside in front of the driver in the axial direction permit optimum use of the installation width, which is available for installing the driver and multi-sprocket arrangement, between the dropouts of the bicycle frame. It is possible as a result not only to attach more sprockets to or in front of the driver. There is also the possibility of shifting the entire multi-sprocket arrangement further axially outwards. Such a shifting makes it possible to reduce an undesirable chain skew of the chain between a front driving sprocket and the sprocket of the rear multi-sprocket arrangement. This is particularly of advantage if only one front driving sprocket is used. Overall, driving efficiency can therefore be improved and wear of the chain reduced if the chain skew is smaller. In addition, chain noises perceived by the cyclist to be unpleasant are reduced.

A space-saving and material-saving configuration of the rear wheel assembly is achieved by the radially self-supporting design of the at least two sprockets. This means that the driver preferably does not require any additional holding element for radially supporting the sprockets arranged axially in front of the driver. The connection of the self-supporting sprockets to a further sprocket with a greater number of teeth and which in turn is coupled or can be coupled to the driver ensures that torques which occur during operation of the bicycle are sufficiently transmitted to the driver and consequently to the rear wheel hub. It goes without saying that any material-saving configuration without an additional holding element also contributes to a reduction in weight of the driver.

The installation width available for the rear wheel hub is used particularly effectively if the three sprockets with the smallest numbers of teeth are arranged in such a manner that the sprocket center plane of the sprocket with the third smallest number of teeth of the multi-sprocket arrangement runs in the region of an axial end surface of the driver or axially outside the driver. In comparison to solutions known from the prior art, the solution according to the disclosure makes it possible to use up to 2.5 mm of the available installation width more for the arrangement of the multi-sprocket arrangement.

Various aspects will be discussed below.

Aspect 1: Multi-sprocket arrangement 126, 1026 for a rear wheel assembly 100, 1000 for a bicycle with a derailleur system, wherein the multi-sprocket arrangement 126 1026 has an axis of rotation 124, 1024 and is designed for coupling, for conjoint rotation, to a driver 116, 1016 of the rear wheel assembly 100, 1000. The multi-sprocket arrangement comprises at least 11 sprockets with differing numbers of teeth. Each sprocket has an inner side surface 130, 1030 and an outer side surface 128, 1028 in the region of its teeth and a sprocket center plane 131, 1031 lying between the inner side surface 130, 1030 and the outer side surface 128, 1028 and running orthogonally with respect to the axis of rotation 124, 1024. The multi-sprocket arrangement is designed in such a manner that, in the mounted state, at least two sprockets R12, R11 with the smallest numbers of teeth are formed in a radially self-supporting manner and are coupled to the driver 116, 1016 via at least one further sprocket R10 with a greater number of teeth. The three sprockets R12, R11, R10 with the smallest numbers of teeth are arranged in such a manner that the sprocket center plane 131, 1031 of the sprocket R10 with the third smallest number of teeth of the multi-sprocket arrangement runs in the region of an axial end surface 142, 1042 of the driver 116, 1016 or axially outside the driver 116, 1016.

Aspect 2: Multi-sprocket arrangement 1026 according to aspect 1, wherein at least the three sprockets R12, R11, R10 with the smallest numbers of teeth are arranged in such a manner that a sprocket inner plane of the sprocket R10 with the third smallest number of teeth, said sprocket inner plane running along the inner side surface 1030, runs in the region of the axial end surface 1042 of the driver 1016 or axially outside the driver 1016.

Aspect 3: Multi-sprocket arrangement 126, 1026 according to aspect 1 or 2, wherein a torque can be transmitted by the sprocket R12 with the smallest number of teeth via an adjacent sprocket R11 with the second smallest number of teeth to the sprocket R10, R10 with the third smallest number of teeth and by the latter to the driver 116, 1016.

Aspect 4: Multi-sprocket arrangement 126, 1026 according to one of the preceding aspects, wherein the two sprockets R12, R11 with the smallest numbers of teeth are releasably connected to each other in the mounted state, preferably by the sprockets engaging in each other with complementary structures and determining a predefined rotational orientation of the two sprockets R12, R11 with respect to each other.

Aspect 5: Multi-sprocket arrangement 126, 1026 according to one of the preceding aspects, wherein the two sprockets R12, R11 with the two smallest numbers of teeth are connected nonreleasably to each other, preferably by the sprockets being joined together or being produced integrally, for example by 3D printing.

Aspect 6: Multi-sprocket arrangement 126, 1026 according to one of the preceding aspects, wherein the two sprockets R12, R11, preferably three sprockets R12, R11, R10, with the smallest numbers of teeth straddle the driver 116, 1016 on the end side at least in sections.

Aspect 7: Multi-sprocket arrangement 126, 1026 according to one of the preceding aspects, wherein the at least two radially self-supporting sprockets R12, R11 can be fixed axially by a locking element 146, 1304.

Aspect 8: Multi-sprocket arrangement 126, 1026 according to aspect 7, wherein the sprocket R12 with the smallest number of teeth has, on its outer side surface 128, 1028, an axial and radial, preferably annular, cut-out 149, 1049 which is designed for axially and radially receiving at least a portion of the locking element 146, 1304.

Aspect 9: Multi-sprocket arrangement 126 according to aspect 7 or 8, wherein an inner diameter of the sprocket R12 with the smallest number of teeth is equal to or smaller than an internal thread diameter of an internal thread of the driver 116. The internal thread is designed for receiving an external thread of the locking element 146.

Aspect 10: Multi-sprocket arrangement 126 according to one of aspects 7 to 9, wherein at least the smallest sprocket R12, preferably the at least two self-supporting sprockets R12, R11, is/are rotatable relative to the locking element 146.

Aspect 11: Multi-sprocket arrangement 126, 1026 according to one of the preceding aspects, wherein the multi-sprocket arrangement comprises at least twelve sprockets, preferably at least thirteen sprockets.

Aspect 12: Multi-sprocket arrangement 126, 1026 according to one of the preceding aspects, wherein the smallest sprocket has ten or fewer teeth.

Aspect 13: Multi-sprocket arrangement 26 for a rear wheel assembly 10 for a bicycle with a derailleur system, preferably according to one of aspects 1 to 12, wherein the multi-sprocket arrangement has an axis of rotation 24 and is designed for coupling, for conjoint rotation, to a driver 16 of the rear wheel assembly 10. The multi-sprocket arrangement comprises at least eleven sprockets with differing numbers of teeth. Each sprocket has an inner side surface 30 and an outer side surface 28 in the region of its teeth and a sprocket center plane 31 lying between the inner side surface 30 and the outer side surface 28 and running orthogonally with respect to the axis of rotation 24. The multi-sprocket arrangement 26 is designed in such a manner that, in the mounted state, with an axial length L2 of the driver 16 from a driver stop 40 to an axially outer end side 42 in a range from 34.5 mm to 35.9 mm, preferably 34.9+/−0.3 mm, the following applies:
a first distance D1 in the axial direction from the driver stop 40 to the outer side surface 28 of the sprocket R12 with the smallest number of teeth is greater than 38 mm, is preferably greater than 39.1 mm, is even more preferably 39.9+/−0.2 mm,
or/and a second distance D2 in the axial direction from the axially outer end side 42 of the driver 16 to an outer side surface 28 of the sprocket R12 with the smallest number of teeth is greater than 4.0 mm, is preferably 5.0+/−0.2 mm.

Aspect 14: Multi-sprocket arrangement 126 for a rear wheel assembly 100 for a bicycle with a derailleur system, preferably according to one of aspects 1 to 12, wherein the multi-sprocket arrangement has an axis of rotation 124 and is designed for coupling, for conjoint rotation, to a driver 116 of the rear wheel assembly 100. The multi-sprocket arrangement comprises at least eleven sprockets with differing numbers of teeth. Each sprocket has an inner side surface 130 and an outer side surface 128 in the region of its teeth and a sprocket center plane 131 lying between the inner side surface 130 and the outer side surface 128 and running orthogonally with respect to the axis of rotation 124. The multi-sprocket arrangement 126 is designed in such a manner that, in the mounted state, with an axial length L2 of the driver 116 from a driver stop 140 to an axially outer end side 142 in a range from 25 mm to 27 mm, preferably 26.0+/−0.2 mm, the following applies: a first distance D1 in the axial direction from the driver stop 140 to the outer side surface 128 of the sprocket R12 with the smallest number of teeth is greater than 34 mm, is preferably 35.0+/−0.2 mm, or/and a second distance D2 in the axial direction from the axially outer end side 142 of the driver 116 to the outer side surface 128 of the sprocket R12 with the smallest number of teeth is greater than 8.0 mm, is preferably 9.0+/−0.2 mm.

Aspect 15: Multi-sprocket arrangement 126 according to aspect 13 or aspect 14, wherein the driver 16, 116 has, on a first region of its radial outer surface, a driver profile 32, 132 which is arranged along a first axial length L1 axially outwards $A_a$ from the driver stop 40, 140. The first axial length L1 is smaller than a second axial length L2 which extends from the driver stop 40, 140 to the axially outer end side 42, 142 of the driver 16, 116. The driver 16, 116 is free from the driver profile 32, 132 on a second region of its radial outer surface, which region is adjacent to the end side 42, 142 of the driver 16, 116. The driver 16, 116 has an opening which extends radially outwards $R_a$ from a driver center axis and axially inwards $A_i$ from the axially outer end side 42; 142, and the opening has an internal thread 38 on its radial inner surface.

Aspect 16: Multi-sprocket arrangement 26, 126 according to aspect 15, wherein the first axial length L1 of the driver 16 116, along which the driver profile 32 132 is arranged on the driver, from the driver stop 40 140 to the end of the driver profile 32 132 is greater than 32.9 mm, preferably 33.2+/−0.2 mm, when the multi-sprocket arrangement (126) is designed according to aspect 13, or the first axial length L1 is greater than 24.7 mm, preferably 25.7+/−0.2 mm, when the multi-sprocket arrangement 26 is designed according to aspect 14.

Aspect 17: Multi-sprocket arrangement 26, 126 according to one of aspects 13 to 16, wherein the second axial length L2 of the driver 16, 116 from the driver stop 40, 140 to the end side of the driver is greater than 34.2 mm, preferably 34.9+/−0.2 mm, when the multi-sprocket arrangement 26 is designed according to aspect 13. The second axial length L2 is greater than 25.0 mm, preferably 26.0+/−0.2 mm, when the multi-sprocket arrangement 126 is designed according to aspect 14.

Aspect 18: Multi-sprocket arrangement 26, 126 according to one of aspects 13 to 17, wherein a first outer diameter d1 of the driver 16, 116 in the first region along the first axial length L1 of the driver is greater than 34.2 mm, is preferably 34.5+/−0.15 mm, when the multi-sprocket arrangement 26 is designed according to aspect 13, or is greater than 32 mm, is preferably 32.60+0.05/−0.1 mm, when the multi-sprocket arrangement 126 is designed according to aspect 14.

Aspect 19: Multi-sprocket arrangement 26, 126 according to one of aspects 13 to 18, wherein a second outer diameter d2 of the driver 16, 116 in the second region which is adjacent to the end side 42 142 of the driver is greater than 31.4 mm, is preferably 32.1+/−0.2 mm, when the multi-sprocket arrangement (26) is designed according to aspect 13, or is greater than 28.5 mm, is preferably 29.5+/−0.1 mm, when the multi-sprocket arrangement 126 is designed according to aspect 14.

Aspect 20: Multi-sprocket arrangement 26, 126 according to one of aspects 13 to 19, wherein a first nominal diameter d3 of the internal thread 38 of the driver axially adjacent to its end side 42; 142 is greater than 29.8 mm, is preferably 30.6+/−0.2 mm, when the multi-sprocket arrangement 26 is designed according to aspect 13, or is greater than 25.2 mm, is preferably 26+/−0.2 mm, when the multi-sprocket arrangement 126 is designed according to aspect 14.

Aspect 21: Multi-sprocket arrangement 1026 for a rear wheel assembly 1000 for a bicycle with a derailleur system, preferably according to one of aspects 1 to 12, wherein the multi-sprocket arrangement has an axis of rotation 1024 and is designed for coupling, for conjoint rotation, to a driver 1016 of the rear wheel assembly 1000. The multi-sprocket arrangement comprises at least eleven sprockets with differing numbers of teeth. Each sprocket has an inner side surface 1030 and an outer side surface 1028 in the region of its teeth and a sprocket center plane 1031 lying between the inner side surface 1030 and the outer side surface 1028 and running orthogonally with respect to the axis of rotation 1024. The multi-sprocket arrangement 1026 is designed in such a manner that, in the mounted state, with an axial length L2 of the driver 1016 from a driver stop 1040 to an axially outer end side 1042 in a range from 28.5 mm to 30.5 mm, preferably 29.5+/−0.2 mm, the following applies: a first distance D1 in the axial direction from the driver stop 1040 to the outer side surface 1028 of the sprocket R12 with the smallest number of teeth is greater than 37.4 mm, is preferably greater than 38.0 mm, is even more preferably 39.9+/−0.2 mm, or/and a second distance D2 in the axial direction from the axially outer end side 1042 of the driver 1016 to an outer side surface 1028 of the sprocket R12 with the smallest number of teeth is greater than 9.1 mm, is preferably 10.4+/−0.2 mm.

Aspect 22: Multi-sprocket arrangement 1026 according to aspect 21, wherein the driver 1016 comprises: a driver body 1302 which has an external thread on a region of its outer circumferential surface that is adjacent to the driver stop 1040, and a receiving body 1304 which, on its inner circumferential surface, has an internal thread 1308 which is designed to engage in the external thread of the driver body 1302. In the assembled state of the driver 1016, the receiving body 1304 is arranged radially outside the driver body 1302 and extends with its axially outer end portion 1309 axially outwards over the driver body 1302, and an inner diameter of the axially outer end portion 1309 of the receiving body 1304 is smaller than an outer diameter of the driver body 1302.

Aspect 23: Multi-sprocket arrangement 1026 according to aspect 22, wherein the axially outer end side 1315 of the multi-sprocket arrangement, preferably the outer side surface 1028 of the sprocket R12 with the smallest number of teeth, ends flush with an axial end side 1316 of the receiving body 1304 or the axially outer end side 1316 of the receiving body 1304 protrudes by a maximum of 0.9 mm.

Aspect 24: Multi-sprocket arrangement 1026 according to aspect 22 or 23, wherein an inner diameter of the receiving body 1304 tapers conically between its internal thread 1308 and its protruding, axially outer end portion 1309.

Aspect 25: Multi-sprocket arrangement 1026 according to one of aspects 22 to 24, wherein an interface 1324 between the receiving body 1304 and the driver body 1302 is arranged axially further on the inside than an interface 1326 between the receiving body 1304 and the multi-sprocket arrangement 1026.

Aspect 26: Multi-sprocket arrangement 1026 according to one of aspects 22 to 25, wherein the driver body 1302 has a driver profile 1032 on its outer circumferential surface which is arranged adjacent to its driver stop 1040.

Aspect 27: Multi-sprocket arrangement 26, 126, 1026 according to one of aspects 15 to 20 or according to aspect 26, wherein the driver profile 32, 132, 1032, comprises eight, nine or twenty-two splines.

Aspect 28: Rear wheel assembly 10, 100, 1000 for a bicycle with a derailleur system, comprising a rear wheel hub which can be arranged between two opposite frame portions 12, 14 of a bicycle frame, a driver 16, 116, 1016 which is attached rotatably to the rear wheel hub, and a multi-sprocket arrangement 26, 126, 1026, which is coupled or can be coupled to the driver 16, 116, 1016 for conjoint rotation, according to one of the preceding aspects.

Aspect 29: Rear wheel assembly 10, 100, 1000 according to aspect 28, furthermore comprising a hub end cap 202 1202 which is arranged on the rear wheel hub 1017 axially adjacent to the driver 16, 116, 1016 in the outer direction, and a further hub end cap 203 which is arranged on the rear wheel hub 1017 adjacent to the frame portion 12 further away from the driver. A hub end cap distance D0 between axially outer end sides 204, 205 of the hub end caps 202, 203 is at least 142 mm, is preferably at least 148 mm, is even more preferably at least 157 mm.

Aspect 30: Rear wheel assembly 10, 100, 1000 according to aspect 29, wherein a third distance D3 between the driver stop 40, 140, 1040 and the axially outer end side 204, 1204 of the hub end cap 202 is greater than 42.5 mm, is preferably 44.1+1.0/−0.3 mm, when the multi-sprocket arrangement 26 is designed according to aspect 13, or is greater than 38.1 mm, is preferably 39.7+/−0.2 mm, when the multi-sprocket arrangement 126 is designed according to aspect 14, or is greater than 42.5 mm, is preferably 44.1+1.0/−0.3 mm, when the multi-sprocket arrangement 1026 is designed according to aspect 21.

Aspect 31: Rear wheel assembly 10, 100, 1000 and bicycle frame for a bicycle with a derailleur system, wherein the rear wheel assembly comprises a rear wheel hub 1017 which is arranged between two opposite frame portions 12, 14, 112, 114, 1014 of the bicycle, a driver 16, 116, 1016 which is coupled rotatably to the rear wheel hub 1017, and a multi-sprocket arrangement 26, 126, 1026 which is coupled or can be coupled to the driver 16, 116, 1016 for conjoint rotation and has at least eleven sprockets with differing numbers of teeth. Each sprocket has an inner side surface 30, 130, 1030 and an outer side surface 28, 128, 1028 in the region of its teeth and a sprocket center plane 31, 131, 1031 lying between the inner side surface and the outer side surface and running orthogonally with respect to the rear wheel hub 1017. In the assembly state of the rear wheel assembly and of the latter on the bicycle frame, a fourth distance D4 in the axial direction from the outer side surface 28, 128, 1028 of the sprocket R12 with the smallest number of teeth to a circumferential surface at the rear dropout 18, 118, 1018 of the bicycle frame, which circumferential surface is adjacent to the rear wheel assembly and is closest thereto, is smaller than 8.2 mm, is preferably 7.2+/−0.2 mm, when the multi-sprocket arrangement 26 is designed according to one of aspects 13, 15 to 20, or is smaller than 8.7 mm, is preferably 7.7+/−0.2 mm, when the multi-sprocket arrangement 126 is designed according to one of aspects 14 to 20, or is smaller than 8.35 mm, is preferably 7.35+/−0.15 mm, when the multi-sprocket arrangement 1026 is designed according to one of aspects 21 to 27, or/and a fifth distance D5 in the axial direction from the outer side surface 28, 128, 1028 of the sprocket R12 with the smallest number of teeth to a recessed surface 56, 156, 1056 at the rear dropout of the bicycle frame, which surface is adjacent to the rear wheel assembly and runs orthogonally with respect to the rear wheel hub 1017, is smaller than 12.2 mm, is preferably 11.2+/−0.2 mm, when the multi-sprocket arrangement 26 is designed according to one of aspects 13, 15 to 20, or is smaller than 12.7 mm, is preferably 11.7+/−0.2 mm, when the multi-sprocket arrangement 126 is designed according to one of aspects 14 to 20, or is smaller than 11.5 mm, is preferably 10.55+/−0.15 mm, when the multi-sprocket arrangement 1026 is designed according to one of aspects 21 to 27.

Aspect 32: Rear wheel assembly 10, 100, 1000 and bicycle frame according to aspect 31, wherein, in the assembly state of the rear wheel assembly with the bicycle frame, a sixth distance D6 is defined between the outer side surface 28, 128, 1028 of the sprocket R12 with the smallest number of teeth and the hub end cap 202, 1202, and a space factor which is produced from the quotient of the fifth distance D5 and the sixth distance D6 is smaller than 3 and greater than 2.2, is preferably between 2.7 and 2.4, is even more preferably 2.5.

Aspect 33: Rear wheel assembly 10, 100, 1000 and bicycle frame according to aspect 32, wherein the sixth distance D6 is 4.7+/−0.2 mm.

Aspect 34: Rear wheel assembly 10, 100, 1000 and bicycle frame according to one of aspects 31 to 33, furthermore comprising a derailleur hanger 58 which is mounted or can be mounted on the rear dropout 18 of the bicycle frame and, in the assembly state, makes contact with the hub end cap 202 such that said derailleur hanger is held at a position in which a rear wheel axle 15 can be guided through the derailleur hanger 58 and the rear wheel hub.

Aspect 35: Rear wheel assembly 10, 100, 1000 and bicycle frame according to one of aspects 31 to 34, wherein the multi-sprocket arrangement of the rear wheel assembly is designed according to one of aspects 1 to 27.

What is claimed is:

1. A multi-sprocket arrangement for a rear wheel assembly for a bicycle with a derailleur system, wherein the multi-sprocket arrangement has an axis of rotation and is designed for rotatably coupling to a driver of the rear wheel assembly, wherein the multi-sprocket arrangement comprises:

at least eleven sprockets with differing numbers of teeth, wherein each sprocket has an inner side surface and an outer side surface in a region of the teeth and a sprocket center plane lying between the inner side surface and the outer side surface and extending orthogonally with respect to the axis of rotation, wherein the multi-sprocket arrangement is configured such that, in a mounted state, at least a first sprocket with the smallest numbers of teeth and a second sprocket with the second smallest number of teeth are formed in a radially self-supporting manner and are coupled to the driver via at least a third sprocket with the third smallest number teeth, and the first, second and third sprockets are arranged in such a manner that a sprocket center plane of the third sprocket with the third smallest number of teeth runs axially outside the driver, wherein the multi-sprocket arrangement is designed in such a manner that, in the mounted state, with an axial length of the driver from a driver stop to an axially outer end side of the driver in a range from 28.5 mm to 30.5 mm, the following applies: a first distance in an axial direction from the driver stop to an outer side surface of the first sprocket with the smallest number of teeth is greater than 37.4 mm, or/and a second distance in the axial direction from the axially outer end side of the driver to the outer side surface of the first sprocket with the smallest number of teeth is greater than 9.1 mm.

2. The multi-sprocket arrangement according to claim 1, wherein at least the first, second and third sprockets are arranged in such a manner that a sprocket inner plane of the third sprocket with the third smallest number of teeth, which the sprocket inner plane running along the inner side surface, runs in a region of an axial end surface of the driver or axially outside the driver.

3. The multi-sprocket arrangement according to claim 1, wherein a torque is transmitted by the first sprocket with the smallest number of teeth via the second sprocket with the second smallest number of teeth to the third sprocket with the third smallest number of teeth and by the third sprocket to the driver.

4. The multi-sprocket arrangement according to claim 1, wherein the first and second sprockets are releasably connected to each other in the mounted state, by engaging in each other with complementary structures and determining a predefined rotational orientation of the first and second sprockets with respect to each other.

5. The multi-sprocket arrangement according to claim 1, wherein the driver comprises:
a driver body which has an external thread on a region of its outer circumferential surface that is adjacent to the driver stop, and
a receiving body which, on its inner circumferential surface, has an internal thread which is designed to engage in the external thread of the driver body, in an assembled state of the driver, the receiving body is arranged radially outside the driver body and extends with its axially outer end portion disposed axially outwards over the driver body, and an inner diameter of the axially outer end portion of the receiving body is smaller than an outer diameter of the driver body.

6. The multi-sprocket arrangement according to claim 5, wherein the outer side surface of the first sprocket with the smallest number of teeth, ends flush with an axial end side of the receiving body or the axially outer end portion of the receiving body protrudes by a maximum of 0.9 mm.

7. A rear wheel assembly for a bicycle with a derailleur system, the rear wheel assembly comprising:
a rear wheel hub which can be arranged between two opposite frame portions of a bicycle frame;
a driver which is attached rotatably to the rear wheel hub; and
a multi-sprocket arrangement, which is coupled to the driver for conjoint rotation, comprising at least eleven sprockets with differing numbers of teeth,
wherein each sprocket has an inner side surface and an outer side surface in a region of the teeth and a sprocket center plane lying between the inner side surface and the outer side surface and extending orthogonally with respect to an axis of rotation,
wherein the multi-sprocket arrangement is configured such that, in a mounted state, at least a first sprocket with the smallest numbers of teeth and a second sprocket with the second smallest number of teeth are formed in a radially self-supporting manner and are coupled to the driver via at least a third sprocket with the third smallest number of teeth, and the first, second and third sprockets are arranged in such a manner that a sprocket center plane of the third sprocket with the third smallest number of teeth runs axially outside the driver,
wherein the multi-sprocket arrangement is designed in such a manner that, in the mounted state, with an axial length of the driver from a driver stop to an axially outer end side of the driver in a range from 28.5 mm to 30.5 mm, the following applies: a first distance in an axial direction from the driver stop to an outer side surface of the first sprocket with the smallest number of teeth is greater than 37.4 mm, or/and a second distance in the axial direction from the axially outer end side of the driver to the outer side surface of the first sprocket with the smallest number of teeth is greater than 9.1 mm.

8. The rear wheel assembly according to claim 7, further comprising a hub end cap which is arranged on the rear wheel hub axially adjacent to the driver in an outer direction, and a further hub end cap which is arranged on the rear wheel hub adjacent to the frame portion further away from the driver, wherein a hub end cap distance between axially outer end sides of the hub end caps is at least 142 mm.

9. The rear wheel assembly according to claim 8, wherein the hub end cap distance between the axially outer end sides of the hub end caps is at least 148 mm.

10. The rear wheel assembly according to claim 9, wherein the hub end cap distance between the axially outer end sides of the hub end caps is at least 157 mm.

11. The rear wheel assembly according to claim 8, wherein a third distance between the driver stop and the axially outer end side of the hub end cap, which is arranged on the rear wheel hub axially adjacent to the driver, is greater than 42.5 mm.

12. A rear wheel assembly and a bicycle frame for a bicycle with a derailleur system, wherein the rear wheel assembly comprises:
a rear wheel hub which is arranged between two opposite frame portions of the bicycle,
a driver which is coupled rotatably to the rear wheel hub, and
a multi-sprocket arrangement which is coupled to the driver for conjoint rotation and has at least eleven sprockets with differing numbers of teeth, wherein each sprocket has an inner side surface and an outer side surface in a region of its teeth and a sprocket center plane lying between the inner side surface and the outer side surface and running orthogonally with respect to the rear wheel hub, wherein the multi-sprocket arrangement is designed in such a manner that, in a mounted state, with an axial length of the driver from a driver stop to an axially outer end side of the driver in a range from 28.5 mm to 30.5 mm, the following applies: a first distance in an axial direction from the driver stop to the outer side surface of a sprocket with the smallest number of teeth is greater than 37.4 mm, or/and a second distance in the axial direction from the axially outer end side of the driver to an outer side surface of the sprocket with the smallest number of teeth is greater than 9.1 mm, or/and a fourth distance in the axial direction from the outer side surface of the sprocket with the smallest number of teeth to a circumferential surface at a rear dropout of the bicycle frame, which the circumferential surface is adjacent to the rear wheel assembly and is closest thereto, is smaller than 8.35 mm, or/and a fifth distance in the axial direction from the outer side surface of the sprocket with the smallest number of teeth to a recessed surface at the rear dropout of the bicycle frame, which the recessed surface is adjacent to the rear wheel assembly and runs orthogonally with respect to the rear wheel hub, is smaller than 11.5 mm.

13. The rear wheel assembly and a bicycle frame according to claim 12, wherein, in an assembly state of the rear wheel assembly with the bicycle frame, a sixth distance is defined between the outer side surface of the sprocket with the smallest number of teeth and a hub end cap, and a space factor which is produced from the quotient of the fifth distance and the sixth distance is smaller than 3.

14. The rear wheel assembly and the bicycle frame according to claim 13, wherein the space factor which is produced from the quotient of the fifth distance and the sixth distance is greater than 2.2.

15. The rear wheel assembly and the bicycle frame according to claim 14, wherein the space factor which is produced from the quotient of the fifth distance and the sixth distance is preferably between 2.7 and 2.4.

16. The rear wheel assembly and the bicycle frame according to claim 15, wherein the space factor which is produced from the quotient of the fifth distance and the sixth distance is 2.5.

17. The rear wheel assembly and a bicycle frame according to claim 13, wherein the sixth distance is 4.7+/−0.2 mm.

18. The rear wheel assembly and a bicycle frame according to claim 12, further comprising a derailleur hanger which is mounted or can be mounted on the rear dropout of the bicycle frame and, in an assembly state, makes contact with a hub end cap such that the derailleur hanger is held at a position in which a rear wheel axle can be guided through the derailleur hanger and the rear wheel hub.

* * * * *